(12) United States Patent
Staples

(10) Patent No.: US 10,583,882 B2
(45) Date of Patent: Mar. 10, 2020

(54) BICYCLE SEAT ATTACHMENT ASSEMBLY

(71) Applicant: D3 Innovation Inc., Squamish (CA)

(72) Inventor: Jonathan Staples, Garibaldi Highlands (CA)

(73) Assignee: D3 Innovation Inc., Garibaldi Highlands Squamish, BC ( * ) Notice: Subject to any disclaimer, the term of this patent is extended or adjusted under 35 U.S.C. 154(b) by 0 days.

(21) Appl. No.: 16/369,494

(22) Filed: Mar. 29, 2019

(65) Prior Publication Data

US 2019/0263464 A1 Aug. 29, 2019

Related U.S. Application Data

(63) Continuation of application No. 16/190,744, filed on Nov. 14, 2018, now Pat. No. 10,370,051.

(60) Provisional application No. 62/656,542, filed on Apr. 12, 2018, provisional application No. 62/587,309, filed on Nov. 16, 2017, provisional application No. 62/595,495, filed on Dec. 6, 2017.

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC ....................................................... B62J 1/08
USPC ......................................... 297/195.1, 215.15
See application file for complete search history.

(56) References Cited

U.S. PATENT DOCUMENTS

| | | | | |
|---|---|---|---|---|
| 5,649,738 A | * | 7/1997 | Thomson | B62J 1/08 297/195.1 |
| 5,664,829 A | * | 9/1997 | Thomson | B62J 1/08 297/195.1 |
| 2009/0066124 A1 | * | 3/2009 | Pirovano | B62J 1/08 297/195.1 |

FOREIGN PATENT DOCUMENTS

| | | | | |
|---|---|---|---|---|
| EP | 3196107 A1 | * | 7/2017 | ............... B62J 1/08 |
| FR | 2409182 A1 | * | 6/1979 | ............... B62J 1/08 |

* cited by examiner

*Primary Examiner* — Anthony D Barfield
(74) *Attorney, Agent, or Firm* — Kevin Shipley; Fogler, Rubinoff LLP

(57) ABSTRACT

A seat attaching may include a lower seat clamp that is moveable relative to a post head member about a pivot axis and includes: a mounting portion having a bearing surface configured to engage a corresponding cradle portion of the post head member a first channel configured to receive a first seat rail of a bicycle seat and a second channel configured to receive a second seat rail of a bicycle seat. An upper seat clamp may include: a central portion overlying the mounting portion; a first extension portion disposed on a first side of the central portion and having a first retainer surface overlying and facing the first channel to retain the first seat rail within the first channel and having a first apex; and a second extension portion disposed on a second side of the central portion and having a second retainer surface overlying and facing the second channel to retain the second seat rail within the second channel and having a second apex. An upper plane may contain both the first apex and second apex and may be substantially parallel to the pivot axis. The upper plane may be offset below the pivot axis and intersecting the bearing surface. A first fastener may be used to secure the upper seat clamp to the post head member.

10 Claims, 18 Drawing Sheets

BICYCLE SEAT ATTACHMENT ASSEMBLY

CROSS-REFERENCE TO RELATED APPLICATION

The present application is a continuation of U.S. patent application Ser. No. 16/190,744, filed Nov. 14, 2018 now U.S. Pat. No. 10,370,051 and entitled Bicycle Seat Attachment Assembly, which itself claims the benefit under 35 U.S.C. § 119(e) of U.S. provisional patent application No. 62/587,309 filed on Nov. 16, 2017 and entitled Bicycle Seat Post Clamp, U.S. provisional patent application No. 62/595,495 filed on Dec. 6, 2017 and entitled Bicycle Seat Post Clamp, U.S. provisional patent application No. 62/656,542 filed on Apr. 12, 2018 and entitled Bicycle Seat Post Clamp, the entirety of which are hereby incorporated by reference.

FIELD OF THE INVENTION

In one of its aspects, the present invention relates to an apparatus for attaching a bicycle seat to a seat post, and in particular to a seat post of adjustable height.

INTRODUCTION

United States patent publication no. 2015/0145294 discloses an adjustable cycle seat including a seat post configured as an I-beam with front and rear flanges and a web therebetween defining side channels. A sleeve about the post is attached to the cycle. At least one spring is interconnected between the post and the sleeve biasing the post upward. An actuatable locking mechanism releasable secures the post to the sleeve.

United States patent publication no. 2011/0291446 discloses a saddle support having a pipe and a fixing clamp with a tightening lower plate and a tightening upper plate mounted at one upper end of the pipe and able to solidly tighten one or more support elements for supporting the saddle.

U.S. Pat. No. 5,466,042 discloses a seat post of a bicycle with an offset. The seat post with an offset includes a tube member. A clamp base is attached to the tube member. A lower clamp is disposed to the clamp base. An upper clamp is disposed to the lower clamp. An adjusting mechanism includes a first bolt member and a second bolt member. The first bolt member further includes a plurality of projected ribs at its outer wall. A spur wheel having a center hole is mounted on the outer wall ribs of the first bolt member and is rotatably disposed inside the clamp base. The second bolt member is disposed opposite to the first bolt member. By this arrangement, the upper clamp member and the lower clamp member are jointly fastened to the clamp base by the first and the second bolt members and an adjustment can be made easily by the help of the spur wheel.

U.S. Pat. No. 5,226,624 discloses a support for mounting a bicycle seat to the upper end of a support post of a bicycle frame including a lower cradle member and a cooperating upper clamping member which are mounted on the post to hold and permit forward and rearward tilting of the seat. The cradle member has a downwardly opening post receiving slot formed therein having a curved inner wall connected to side walls extending outwardly at obtuse angles of approximately 140°. A support member formed at the upper end of the seat post has a transverse fulcrum line at the juncture of two upper surfaces inclined with respect to one another for tilting the clamping mechanism and the seat. The support member has chamfered edges formed at the ends of the fulcrum line for engaging the side walls of the post slot at diametrically opposed surfaces of engagement to prevent transverse movement of the support and the seat with respect to the seat post.

U.S. Pat. No. 4,421,357 discloses a saddle support device for a bicycle. The disclosed device includes a support member provided at the upper portion of a seat post of the bicycle and a clamp mechanism which includes a receiving member and a holding member to hold the saddle member therebetween. The device also includes a locking member, which presses the holding member against the receiving member, fixing it to the support member, thereby allowing the saddle to be rotatable around the lengthwise axis of the locking member and adjustable longitudinally and laterally relative to the bicycle frame. The support member and receiving member each have a through-bore perforating their upper and lower surfaces. The holding member has a corresponding threaded bore at the center of its lower surface. When constructed, the holding member is placed on the receiving member and the locking member is inserted through the through-bore in the support member and the through-bore in the receiving member and is screwed into a threaded bore of the holding member to tightly clamp the saddle frame between the holding member and the receiving member, so that the clamping mechanism is fixed to the support member.

SUMMARY

The purpose of a seat post clamp is to secure a bicycle seat to the bicycle seat post assembly. For bicycle seats that include seat rails, the seat post clamp can be configured to engage and retain the seat rails. Conventional seat post clamps may also allow for angular adjustment about an axis parallel to the ground and perpendicular to the direction of travel of the bicycle.

In a 'two-bolt' seat post system, the seat post head may include two through holes, to the fore and aft, of a semicircular cradle. The cradle can allow rotation about the semicircle's central axis. This rotational degree of freedom ultimately controls the angle of the seat once mounted. Bolts are mounted through the fore and aft holes in the seat post head and through matching holes in the seat post upper clamp. Nuts mounted to the top surface of the upper clamp typically threadedly engage with the bolts to allow the upper clamp to be pulled towards the seat post head thereby sandwiching the lower clamp between the upper clamp and the seat post head. Both the upper and lower clamps typically have fore-aft running semi-circular channels sized and shaped to match the profile of the bicycle seat's rails. When the seat rails are located in the upper and lower clamp channels, the seat can be fully constrained by tightening the bolts. If the rear bolt is loosened and the front bolt is tightened, the angle of the seat will rotate clockwise as viewed from the right-hand side of the bicycle. If the rear bolt is tightened and the front bolt is loosened, the angle of the seat will rotate counter-clockwise as viewed from the right-hand side of the bicycle.

The axes of the clamp channels are typically normal to, and at substantially the same elevation from the ground as, the cradle axis to facilitate removal of the seat. Removal of the seat is typically completed by loosening the bolts without completely removing the nuts, lifting the top clamp to disengage the clamp channels from the seat rails, sliding the seat along the axis of the semi-circular cradle of the lower clamp until the seat can be rotated free of the clamp channels. The upper and lower clamps typically remain attached to the seat post head but this removal process is often quite difficult without resorting to complete removal of the bolts and nuts.

In recent years, 'dropper' seat posts have become more desirable. Dropper seat posts are telescopic posts that allow the rider to change the height of their seat without having to stop and adjust the mechanically tightened seat post collar. It is advantageous to lower the bicycle seat as far as possible when riding through technical terrain to allow the rider to change body position or bend their knees deeply without contacting the seat.

Shorter riders are often required to use shorter travel dropper posts because there is less distance between the top of the bicycle frame and the rails of the bicycle seat when at their preferred seat height.

Despite the advances made to date in the development of bicycle seat attachment assemblies, there is room for improvement to address the above-mentioned problems and shortcomings of the prior art.

It may be an object of the present invention to obviate or mitigate at least one of the above-mentioned disadvantages of the prior art, and to provide a novel seat attaching assembly for a bicycle seat attachment assembly.

The teachings described herein may, in one broad aspect, relate to a seat attaching assembly for attaching a bicycle seat to a seat post, the seat attaching assembly comprising (a) a lower seat clamp being selectably moveable relative to a post head member about a pivot axis to change an orientation of the lower seat clamp, the lower seat clamp comprising (i) a mounting portion having a bearing surface configured to engage a corresponding cradle portion of the post head member, (ii) a first channel configured to receive a first seat rail of a bicycle seat, and (iii) a second channel configured to receive a second seat rail of a bicycle seat; (b) an upper seat clamp comprising: (i) a central portion overlying the mounting portion; (ii) a first extension portion disposed on a first side of the central portion and having a first retainer surface overlying and facing the first channel to retain the first seat rail within the first channel and having a first apex; (iii) a second extension portion disposed on a second side of the central portion and having a second retainer surface overlying and facing the second channel to retain the second seat rail within the second channel and having a second apex; (c) an upper plane containing both the first apex and second apex and being substantially parallel to the pivot axis, the upper plane being offset below the pivot axis and intersecting the bearing surface; and (d) at least a first fastener for securing the upper seat clamp to the post head member and inhibiting movement of the lower seat clamp relative to the post head member.

The teachings described herein may, in another broad aspect, relate to a seat attaching assembly for attaching a bicycle seat to a seat post, the seat attaching assembly comprising: (a) a lower seat clamp being selectably moveable relative to a post head member about a pivot axis to change an orientation of the lower seat clamp, the lower seat clamp comprising: (i) a mounting portion having a bearing surface configured to engage a corresponding cradle portion of the post head member, the bearing surface defining a rotation perimeter centered about the pivot axis; (ii) a first channel configured to receive a first seat rail of a bicycle seat; (iii) a second channel configured to receive a second seat rail of a bicycle seat; (b) an upper seat clamp comprising: (i) a central portion overlying the mounting portion; (ii) a first extension portion disposed on a first side of the central portion and having a first retainer surface overlying and facing the first channel to retain the first seat rail within the first channel and having a first apex; (iii) a second extension portion disposed on a second side of the central portion and having a second retainer surface overlying and facing the second channel to retain the second seat rail within the second channel and having a second apex; (c) an upper plane containing both the first apex and second apex and being substantially parallel to and offset below the pivot axis; and (d) at least a first fastener for securing the upper seat clamp to the post head member and inhibiting movement of the lower seat clamp relative to the post head member, the first fastener extending along a first fastener axis, the first fastener axis being outside the rotation perimeter.

The teachings described herein may, in another broad aspect, relate to a seat attaching assembly for attaching a bicycle seat to a seat post, the seat attaching comprising: (a) a lower seat clamp being selectably moveable relative to a post head member about a pivot axis to change an orientation of the lower seat clamp, the lower seat clamp comprising: (i) a mounting portion having a bearing surface configured to engage a corresponding cradle portion of the post head member, the bearing surface defining a rotation perimeter centered about the pivot axis; (ii) a first channel configured to receive a first seat rail of a bicycle seat and extending along a first channel axis; (iii) a second channel configured to receive a second seat rail of a bicycle seat and extending along a second channel axis; (b) an upper seat clamp comprising: (i) a central portion overlying the mounting portion; (ii) a first extension portion disposed on a first side of the central portion and having a first retainer surface overlying and facing the first channel to retain the first seat rail within the first channel and having a first apex; (iii) a second extension portion disposed on a second side of the central portion and having a second retainer surface overlying and facing the second channel to retain the second seat rail within the second channel and having a second apex; (c) an upper plane containing both the first apex and second apex and being substantially parallel to and offset below the pivot axis; (d) at least a first fastener for securing the upper seat clamp to the post head member and inhibiting movement of the lower seat clamp relative to the post head member, the first fastener extending along a first fastener axis, the first fastener axis being outside the rotation perimeter; and (e) a channel plane containing both the first channel axis and the second channel axis, the channel plane either intersecting or being disposed below the bearing surface.

The above aspects may be used in combination with each other and other aspects of the teachings described herein, which may be used in combination with any other aspects, including the three broad aspects listed above may include that the bearing surface defines a rotation perimeter centered about the pivot axis and the first fastener extends along a first fastener axis and the first fastener axis is outside the rotation perimeter.

A second fastener may be used for securing the upper seat clamp to the post head member and inhibiting movement of the lower seat clamp relative to the post head member. The second fastener may extend along a second fastener axis. The second fastener axis may be outside the rotation perimeter.

The first and second fastener axes may be on opposite sides of the rotation perimeter.

At least one of the first fastener and the second fastener may be entirely outside the rotation perimeter.

The first channel may extend along a first channel axis and the second channel may extend along a second channel axis. A channel plane containing both the first channel axis and the second channel axis may either intersects or may be disposed below the bearing surface.

The upper plane may be disposed between the channel plane and the pivot axis.

The channel plane may be disposed below the pivot axis.

The channel plane may intersect the bearing surface.

The first channel may extend along a first channel axis and the second channel may extend along a second channel axis. The first channel may have a curved lower surface to support the first seat rail and the second channel may have curved lower surface to support the second seat rail. The first channel curved lower surface may form part of a first channel perimeter centered about the first channel axis and the second channel curved lower surface may form part of a second channel perimeter centered about the second channel axis. The upper plane may be tangent to both the first channel perimeter and the second channel perimeter.

The bearing surface may be a generally smooth, curved surface to slidingly engage the cradle portion. A radius of curvature of the bearing surface may define a radius of curvature of the rotation perimeter.

The first extension portion of the upper seat clamp may extend outwardly and downwardly from the first side of the central portion. The second extension portion of the upper seat clamp may extend outwardly and downwardly from the second side of the central portion.

The upper seat clamp may be of integral, one-piece construction.

Thus, the present inventors have developed a seat attaching assembly for a bicycle comprising an upper and lower seat clamp. The upper clamp can be secured to a post head member on a bicycle by a fastening means. The lower clamp comprises channels for receiving the rails of a bicycle seat and a mounting portion with a bearing surface that defines a pivot axis and that can engage with and rotate relative to a bicycle post head member. The channels of the lower clamp are located sufficiently below the pivot axis such that when a bicycle seat is mounted in the lower clamp, the bicycle seat rails are located below the pivot axis. This allows for longer travel dropper posts to be used on bicycles, as compared to previously reported bicycle seat clamps. In addition to allowing for longer travel dropper posts, the present seat attaching assembly may allows, in some examples, for bicycle seat rails to be inserted and removed from between the upper and lower clamps without having to completely remove the fastening means from the seat attaching assembly.

To the knowledge of the inventors, a seat attaching assembly with such a combination of features is heretofore unknown.

Other advantages of the invention will become apparent to those of skill in the art upon reviewing the present specification.

BRIEF DESCRIPTION OF THE DRAWINGS

Embodiments of the present invention will be described with reference to the accompanying drawings, wherein like reference numerals denote like parts, and in which.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

A seat attachment assembly is an apparatus that can be used to attach a bicycle seat to another portion of a bicycle, and typically is used to connect the seat to an upper end of a seat post or similar structure. Some seat posts have a fixed length, while others (referred to as dropper posts herein) can be of variable/adjustable length. Changing the length of the seat post can change the position of the seat relative to the frame. When the seat is lowered, it can allow for more clearance between the seat and the body of a rider than when the seat is raised. This may be desirable, for example, when riding over rough terrain.

Dropper posts are available in different sizes, having different lengths of travel and different minimum and maximum seat heights. In some circumstances, the minimum height of the seat may prevent relatively shorter riders from utilizing a preferred dropper post. The minimum seat height using a given seat post may be influenced by the distance between the upper most portion of the seat (for example, the upwardly facing seating surface) and the upper end of the seat post. Reducing such a distance, such as by using a new seat attachment assembly, may help reduce the minimum seat height, which may help improve the spacing between the seat and the rider when the apparatus is in use and the seat is dropped, and may broaden the range of dropper posts that may be usable by a given rider.

Figure 1:
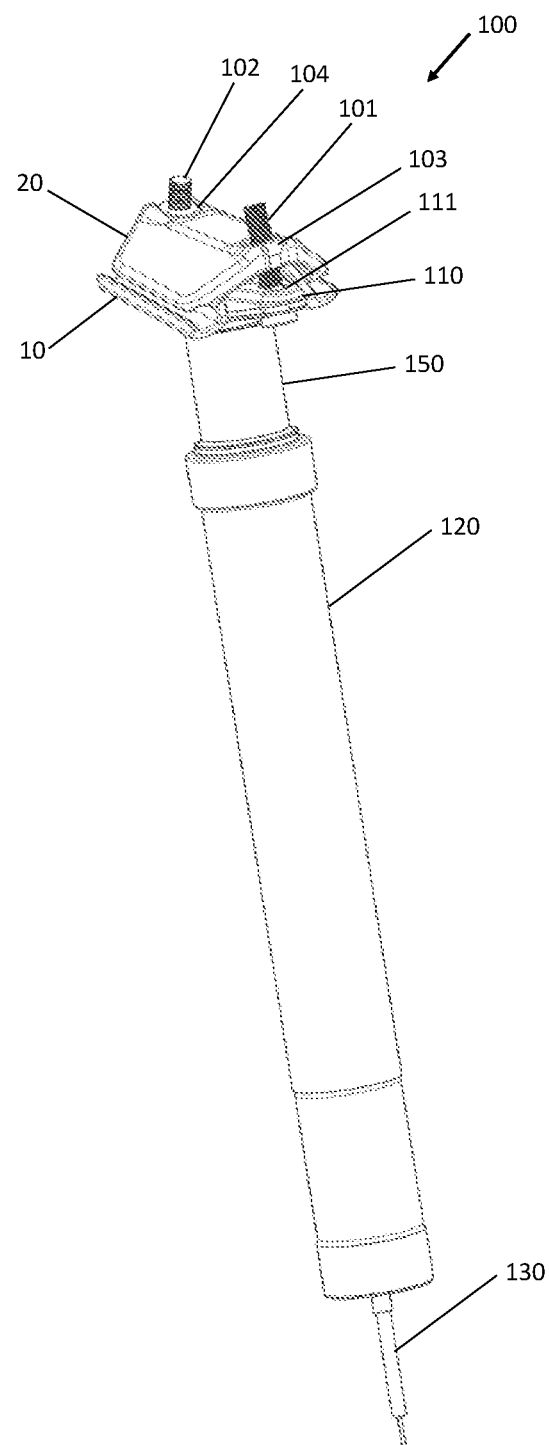
FIG. 1 is a front perspective view of one example of a seat attaching assembly attached to a seat post.
Figure 2:
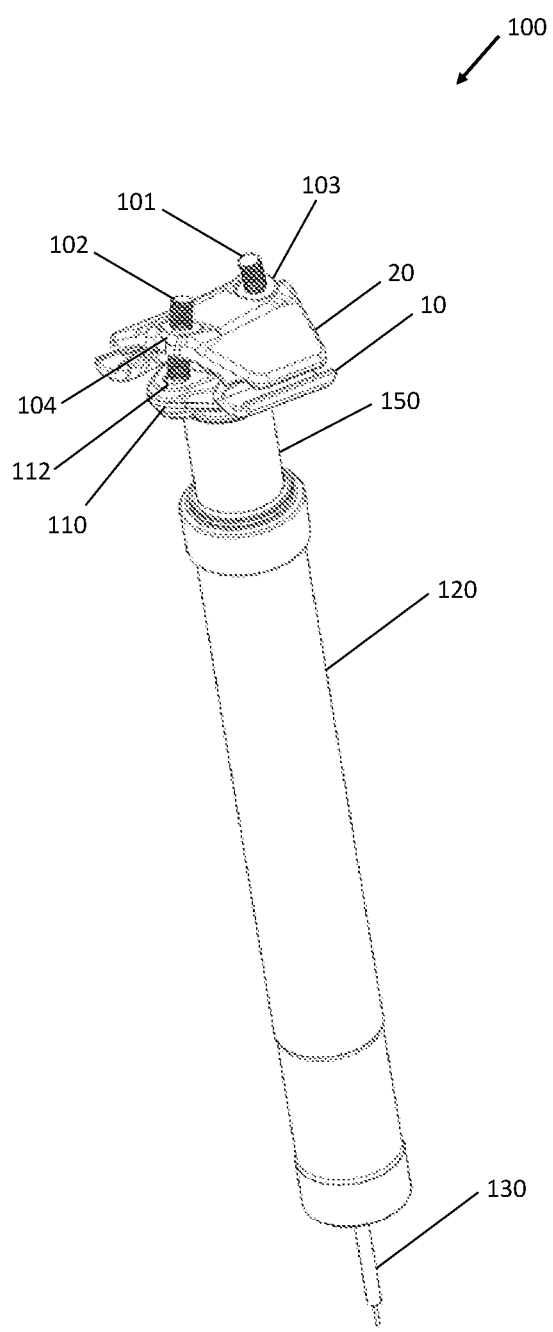
FIG. 2 is a rear perspective view of the seat attaching assembly of FIG. 1.
Figure 14:
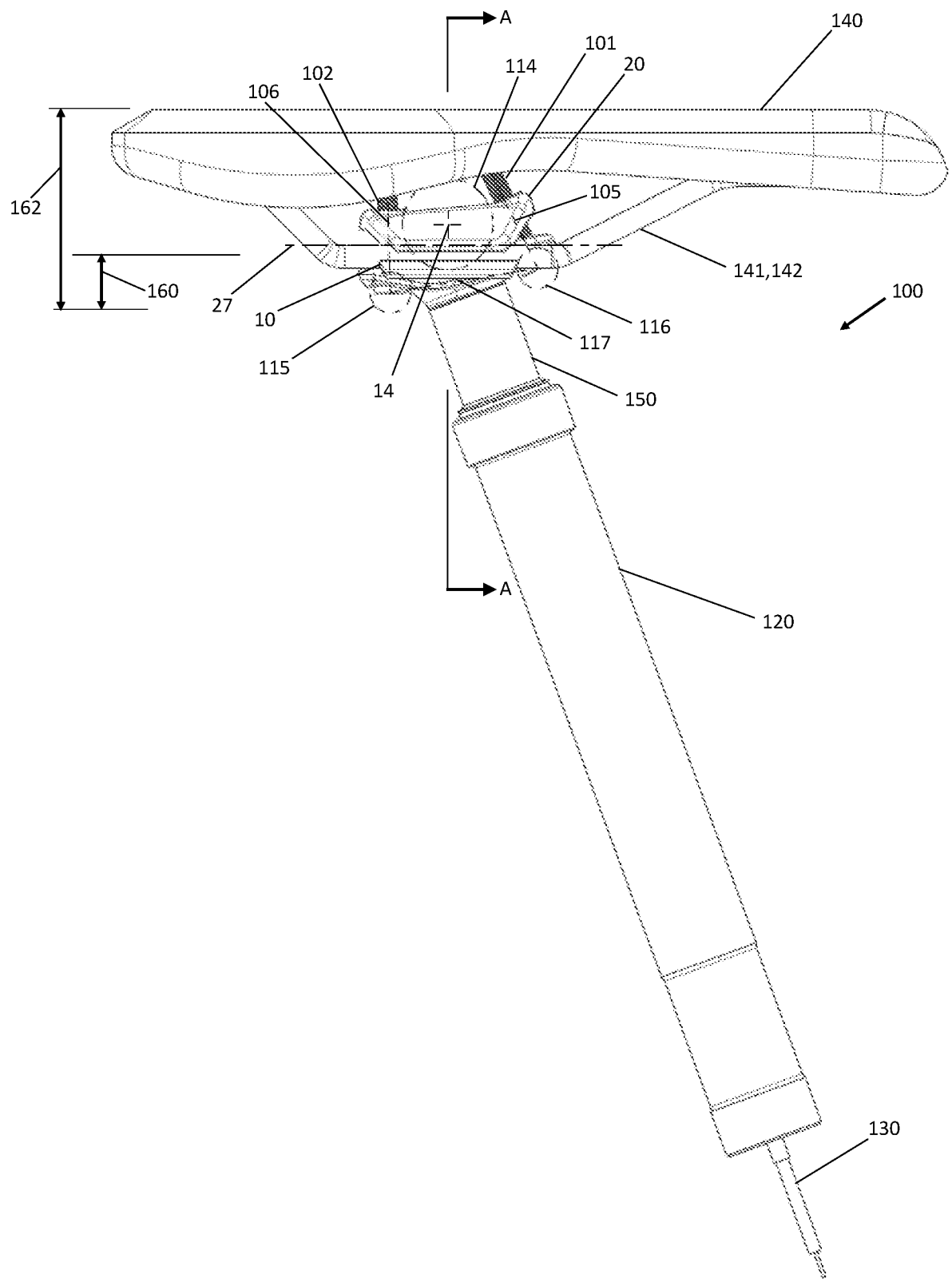
FIG. 14 is a side view of the seat attaching assembly of FIG. 1, wherein the seat attaching assembly is securing the rails of a bicycle seat.

Referring to FIGS. 1 and 2, one example of a seat attaching assembly 100 is shown connected to an upper end of a seat post for a bicycle, but without a bicycle seat being illustrated (see seat 140 in FIG. 14). The seat attaching assembly 100 may be configured to connect to any suitable type of seat post, including a fixed seat post or, as shown in these figures, a dropper post assembly. The dropper post assembly may be of any suitable configuration and may be, for example, a OneUp Components dropper post sold by OneUp Components™, of British Columbia, Canada.

In the illustrated example, the dropper post assembly includes an upper post tube 150 that is slidably received in a lower post tube 120 that can be connected to a bicycle frame (not shown), and an actuation line 130 that can be connected to any suitable dropper post remote, such as the dropper post remote available from OneUp Components™. The dropper post assembly may also include any suitable internal spring or biasing member or other such mechanism (not shown) that can help support the upper post tube 150 in at least a raised and a lowered position relative to the lower post tube. For example, the actuation line 130 can be used to activate the internal mechanism to unlock upper post tube 150 from lower post tube 120 and allow a user to raise and lower the upper post tube 150 (and any seat attached thereto) relative to lower post 120 and the rest of the bicycle frame.

In this embodiment, the seat attachment assembly 100 includes a post head member 110, a lower seat clamp 10, a complimentary upper seat clamp 20 that overlies and generally opposes the lower seat clamp 10, and a pair of fasteners, in the form of bolts 101 and 102, that can be used to secure the seat attachment assembly 100 together.

Figure 11:
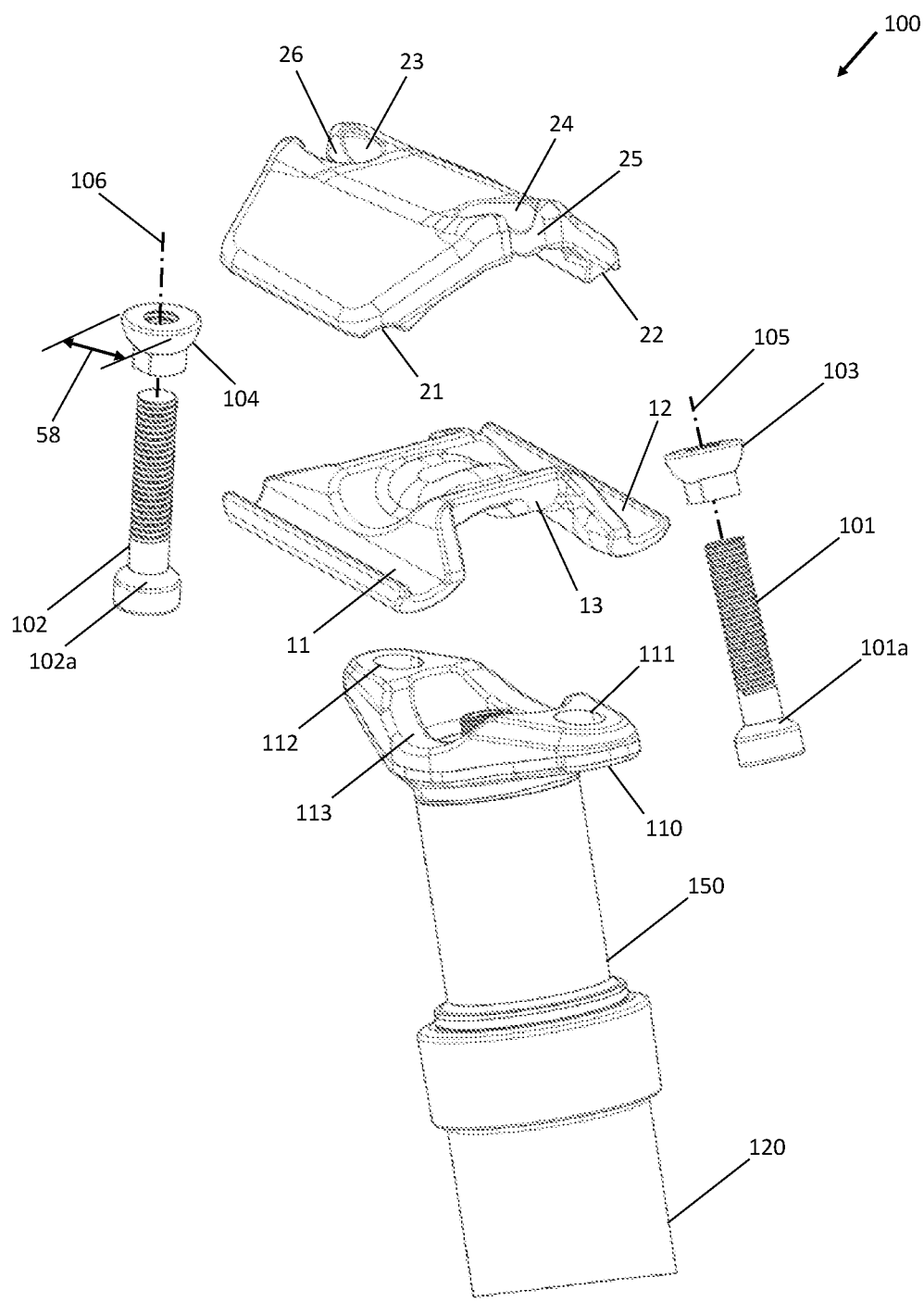
FIG. 11 is a partially exploded perspective view of the seat attaching assembly of FIG. 1.

The post head member 110 can be secured to the upper post tube 150 in any suitable manner (i.e. friction fit, welding, gluing, etc.), and/or using any suitable fasteners (such as a bolt, etc.) or preferably would be integrally formed with upper post tube 150. Preferably, when the seat attachment assembly 100 is in use, the post head member 110 is fixed relative to the upper post tube 150. The post head member 110 is preferably configured to engage and at least partially support the other components of the seat attachment assembly 100 relative to the upper post tube 150. Referring also to FIG. 11, in the illustrated example, the post head member 110 comprises a cradle portion 113 forming at least part of its upper surface (i.e. a surface that is generally upwardly facing when the bicycle is in use) that is configured to engage with a complimentary bearing surface on the lower seat clamp 10. The cradle portion 113 can be any shape that allows for a given embodiment of the lower seat clamp 10 to engage with and rest on the cradle portion 113. The lower portion of the post head member is configured to be connectable to a bicycle seat post.

Optionally, the cradle portion 113 can be configured to help facilitate relative pivoting/rotation of other portions of the seat attachment assembly 100, such as the lower seat clamp 10 and upper seat clamp 20, to help accommodate a generally forward/rearward tilting of the bicycle seat relative to the upper post tube 150 to suit a rider/user's preferences. In such embodiments, the cradle portion 113 and a corresponding portion of the lower seat clamp 10 can be configured to movingly, and optionally slidingly, engage each other to help allow the desired pivot/rotation.

Figure 3:
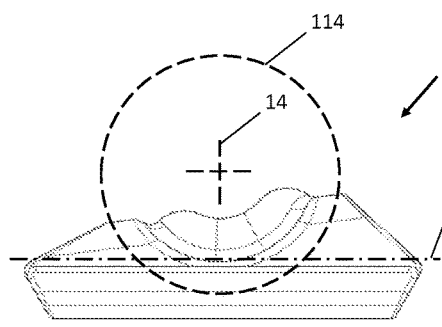
FIG. 3 is a side view of a portion of the seat attaching assembly of FIG. 1.
Figure 4:
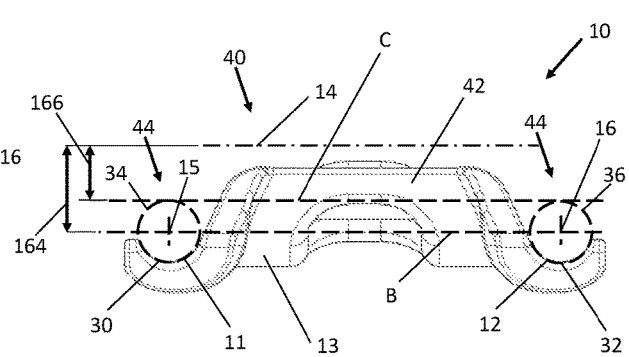
FIG. 4 is a front view of the portion of the seat attaching assembly of FIG. 3.
Figure 5:
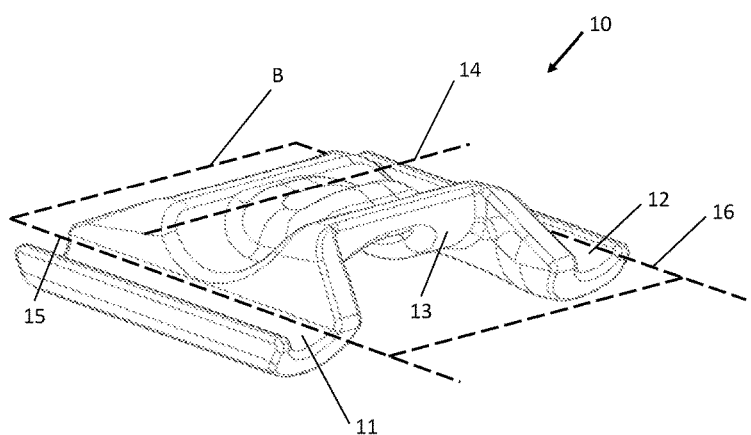
FIG. 5 is a front perspective view of the portion of the seat attaching assembly of FIG. 3.

Referring to FIGS. 3-5, in this embodiment the lower seat clamp 10 includes a main body 40 that includes a mounting portion 42 that can have any suitable configuration that is compatible with the associated post head member 110. In this example, the mounting portion 42 is a generally central portion of the main body 40 (i.e. in the left/right direction) and includes a bearing surface 13 that is complementary to the cradle portion 113. If, as illustrated, the cradle portion 113 is generally curved then the bearing surface 13 may also be generally curved/arcuate. This configuration may help facilitate rotation between the lower seat clamp 10 and the post head member 110 when the lower seat clamp 10 is engaged with the cradle portion 113. In the illustrated embodiment, the cradle portion 113 is generally "U" shaped to correspond to the generally "U" shaped bearing surface 13. The cradle portion 113 may be a single unitary surface, or may include two or more portions (as show in the illustrated examples), which may help accommodate other features of the assembly. Optionally, the surfaces of the bearing surface 13 and corresponding cradle portion may be toothed or splined to create a stepped rotational engagement. Such an arrangement may resist pivoting movement between the cradle portion 113 and the bearing surface 13 when the assembly is in use (i.e. when the fasteners are tightened). Surfaces that include such stepped or otherwise roughened surface features may still be generally curved/arcuate in the front/back direction to help accommodate the desired pivoting. While not as smooth as some of the bearing surfaces described herein, such stepped, toothed or splined surfaces can generally be considered to define a general curvature of the bearing surface 13 as described herein (for example in relation to defining the rotation perimeter 114). Providing a roughened bearing surface 13 and/or cradle portion 113 may help reduce the stress on the fasteners when the assembly is in use, and/or may help inhibit unwanted pivoting of the seat even if the fasteners loosen slightly while the assembly is in use.

The lower seat clamp 10 also preferably includes two spaced apart rail securing members for engaging and retaining the rails on a given bicycle seat when the seat attachment assembly is in use. In the illustrated embodiment, rail securing members include two channels 11, 12 that are disposed on opposing sides of the lower seat clamp 10. The channels 11 and 12 are, in this example, generally elongate channels that extend substantially in the forward/backward direction (with respect to the orientation of the direction of travel of the bicycle when the seat attachment assembly 100 is in use). The first channel 11 extends along and defines a first channel axis 15 and the second channel 12 extends along and defines a second channel axis 16.

The channels 11 and 12 are configured to receive and hold the rails (see rails 141 and 142 in FIG. 14) of a bicycle seat (see seat 140 in FIG. 14). To facilitate engagement between the channels and the rails, the channels 11 and 12 are configured to have a size and shape that is generally complementary to the expected size and shape of the seat rails 141 and 142. This can help ensure that the fit between the channels 11 and 12 and the rails 141 and 142 is such that relative movement between the channels 11 and 12 and the rails 141 and 142 is reduced when the seat attachment assembly 100 is in use.

Figure 6:
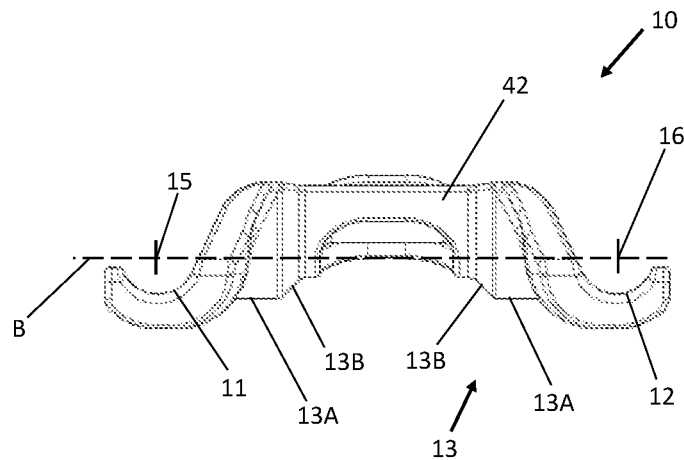
FIG. 6 is a front view of another example of the portion of the seat attaching assembly of FIG. 4.
Figure 7:
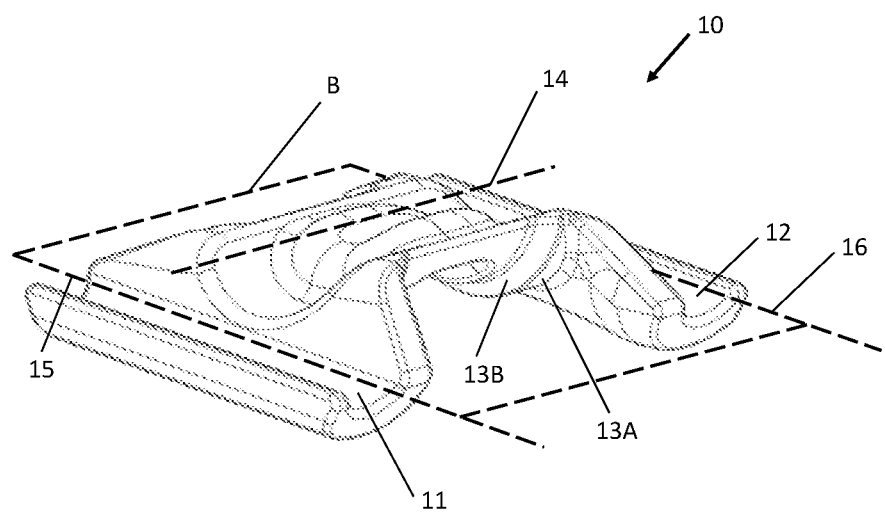
FIG. 7 is a front perspective of the portion of the seat attaching assembly of FIG. 6.
Figure 17:
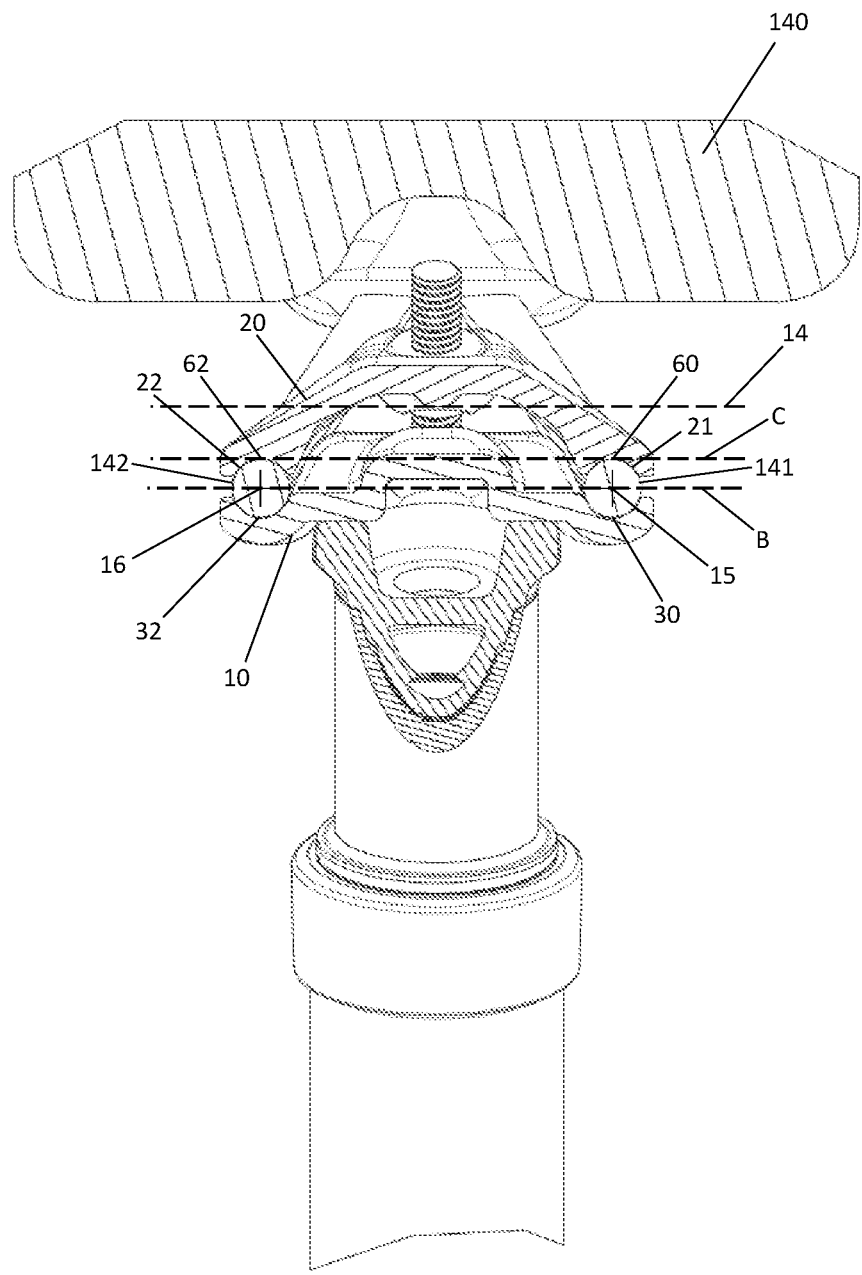
FIG. 17 is a front cross-sectional view of the seat attaching assembly of FIG. 14, taken along section A-A.
Figure 18:
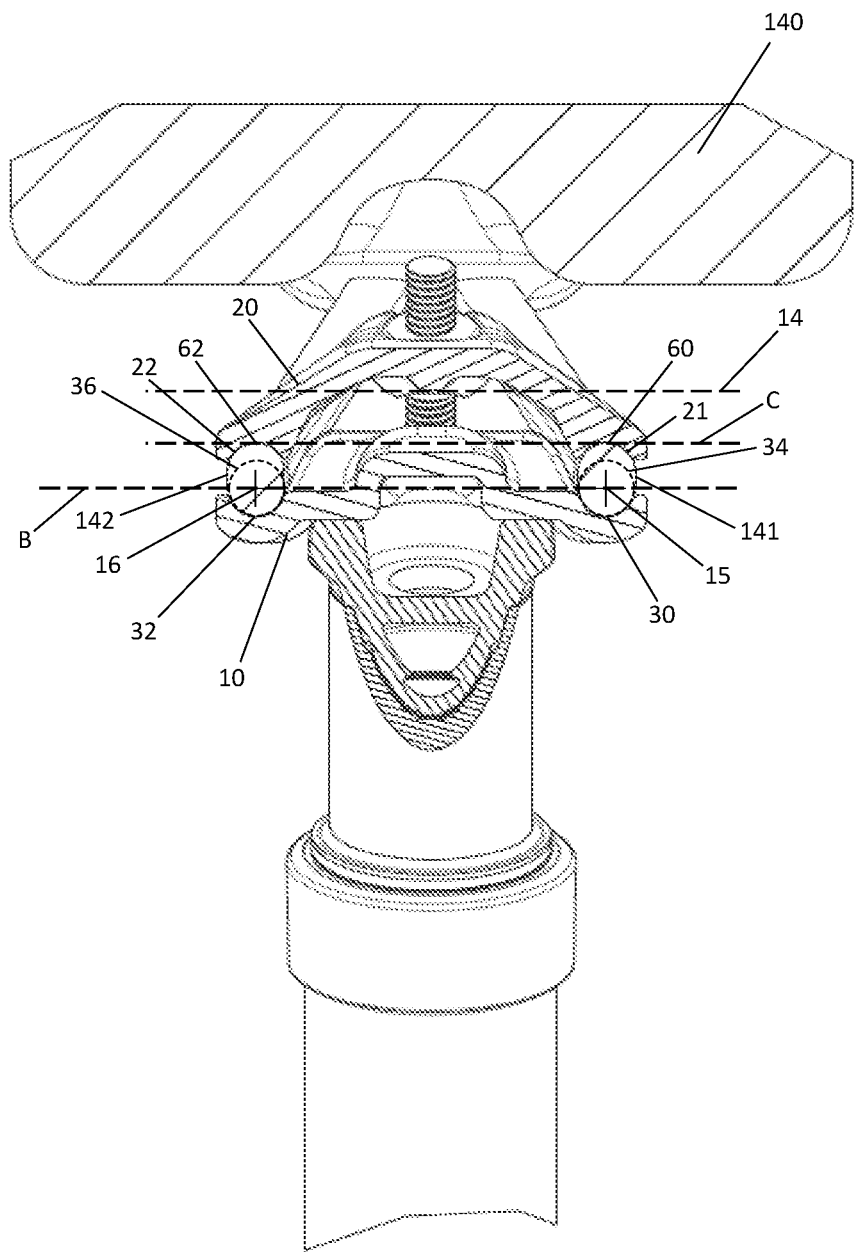
FIG. 18 is a front cross-sectional view of another example of a seat attaching assembly.

In the illustrated embodiment, the channels 11, 12, and their respective axes 15 and 16, are shown as being substantially parallel to each other and are sized and shaped to match the profile of circular rails 141, 142 of a bicycle seat 140 (see, for example, FIGS. 4, 5, and 17. FIGS. 6, 7, and 18 illustrate an embodiment of the seat attaching assembly in which the channels 11, 12, and their respective axes 15, 16 are substantially parallel to each other and are sized and shaped to match the profile of oval seat rails. Alternatively, the channels 11 and 12 need not be parallel to each other and instead may be oriented in any arrangement that corresponds to the orientation of the associated seat rails. Similarly, while shown as having a curved/circular cross-sectional shape in the illustrated examples, the channels 11 and 12 may be constructed to correspond to any seat rail shape and size, including but not limited to rails that have non-circular, arcuate or curved, square, or hexagonal cross-sectional shapes, or the like.

To help accommodate insertion and removal of the seat rails 141 and 142, the channels 11 and 12 may have an open area or other such structure to help accommodate insertion and removal of the seat rails 141 and 142 in a generally lateral manner (i.e. in a direction that is generally orthogonal to the axes 15 and 16), and supporting surfaces on which the seat rails 141 and 142 may rest. In the illustrated example, the channels 11, 12 are configured to have an open upper portion 44 and lower support surfaces 30 and 32 that can support the rails 141 and 142. In the illustrated embodiment, the seat rails 141 and 142 are generally circular and the supporting lower surfaces 30 and 32 are curved, and can be generally circular or ovular in shape, or can have another suitable shape.

For the purposes of describing the relative position of different features of the present seat attaching assembly, it may be useful to refer to illustrated channel perimeters 34 and 36, which are in the illustrated example representations of extensions of the lower surfaces 30 and 32 of channels 11 and 12, respectively. Here, channel perimeters 34 and 36 are shown as circles because the lower portions of channels 11 and 12 are shaped and sized to support circular seat rails; however, channel perimeters 34, 36 could have a different shape, as determined by the shape of channels 11, 12 and the corresponding seat rails 141, 142.

In the illustrated embodiment, the curved lower surface 30 of the first channel 11 forms part of the first channel perimeter 34 that is centered about the first channel axis 15. The curved lower surface 32 of the second channel 12 forms part of the second channel perimeter 36 that is centered about the second channel axis 16. The radius of each of the first and second channel perimeters 34, 36 can be related to, and may be the same as, the radius of curvature of the lower surfaces 30 and 32, and may be between about 1 mm and 10 mm, and is preferably between about 2 mm and 7 mm.

As noted herein, the lower clamp is preferably configured to interface with a post head on the upper end of a dropper post. To facilitate this, the lower clamp includes a bearing surface, which is configured to be complementary to and engage with a corresponding cradle portion on the post head. The bearing surface and corresponding cradle portion can be any suitable pair of engaging surfaces. In the illustrated embodiment, substantially all of the centre curved bearing surface engages with the cradle portion, and the spaced apart portions of the bearing surface are generally co-planar. However, in other embodiments, at least some of the 13 bearing surface and at least some of the cradle portion 113 may include inclined, laterally curved or other such configurations. For example, referring to the embodiment of FIGS. 6 and 7, in some embodiments, the bearing surface 13 may comprise two, generally planar (i.e. generally horizontal as illustrated) portions 13A and two opposing, angled portions surfaces 13B extending therefrom. In this arrangement, both of the surface portions 13A and 13B may rest against corresponding portions of a cradle portion 113, or optionally only some of the surfaces 13A and 13B (such as only the angled side surfaces) may engage with the cradle portion. Such angled portions 13B of the bearing surface need not be co-planar, and may be tapered or inclined so as to widen toward the upper or lower side (as shown) of the lower seat clamp 10. Alternatively, in some embodiments the cradle portion 113 and bearing surface 13 may be arranged so that one only of the surfaces 13A or 13B actually engages and bears against the cradle 113 while the assembly is in use. For example, the assembly may be configured such that surfaces 13B alone acts as the bearing surface 13, and surfaces 13A are not under load when the assembly is in use. Furthermore, the bearing surface can be optionally removeable from the cradle portion or it can be secured thereto.

Referring to FIGS. 3-5 and 11, in the illustrated embodiment the bearing surface 13 is "U" shaped; however, the bearing surface 13 and corresponding cradle portion 113 can be any shape that allows for the lower clamp 10 to rotate relative to the post head member 110 when the lower clamp 10 is engaged with the cradle portion 113 of the post head member 110. Furthermore, while the bearing surface 13 and cradle portion 113 are symmetrical in the illustrated embodiment, a constant radius of curvature may not be required, provided the bearing surface 13 can still engage with and rotate relative to the cradle portion 113.

In seat attaching assemblies configured to allow for forward/backward pivoting of the seat, the lower clamp can define a pivot axis about which the lower clamp rotates relative to the post head when the bearing surface is engaged with the cradle portion of the post head. In such cases, the bearing surface extends along the pivot axis.

In the illustrated embodiment, bearing surface 13 defines a pivot axis 14, about which the lower clamp 10 can pivot when the bearing surface 13 is engaged with the cradle portion 113. Pivoting about this axis 14 allows changing the angle/inclination of a bicycle seat 140 once the seat 140 is mounted in the lower clamp 10.

Again, for the purposes of describing the relative position of different features of the present seat attaching assembly, it may be useful to refer to a channel plane B that is defined as the plane that contains the first and second channel axes 15, 16. Preferably, the seat attachment assembly 100 can be arranged so that the channel plane B is spaced below the pivot axis 14 when the seat attachment assembly 100 is in use. More preferably, the seat attachment assembly 100 can be arranged such that the channel plane B either intersects or is disposed below the bearing surface when the seat attachment assembly 100 is in use. This can help facilitate the relatively lower positioning of the seat rails 141 and 142, which can help position the seat 140 in a desired location and help reduce the overall distance 160 (FIG. 14) between the channel plane B and the upper post tube 150, and the associated distance 162 between the upper surface of the seat 140 the upper post tube 150. As illustrated in this example, the distances 160 and 162 can be increased by providing the channel plane B below the pivot axis 14 and preferably increasing the distance 164 (FIG. 14) between the channel plane B and the pivot axis 14.

Referring to FIG. 4, in the illustrated example, when the bearing surface 13 is engaged with the cradle portion 113, the channel plane B is spaced apart from and below the pivot axis 14. In this arrangement, the lower seat clamp 10 is configured so that the channel plane B intersects the bearing surface 13. This can help allow the lower seat clamp 10 nest within the post head member 110 and can help reduce the distance 164.

Alternatively, in other embodiments the lower seat clamp 10 can be configured so that the channels 11 and 12 are lower than those illustrated in FIGS. 3-5, and can be arranged so that the channel plane B is spaced below the pivot axis 14 and spaced below the bearing surface 13 (rather than intersecting the bearing surface 13).

Optionally, the distance 164 between the channel plane B and the pivot axis 14 can be between about 5 mm and about 30 mm, is preferably between about 5 mm and 15 mm, and more preferably is about 10 mm. Providing a relatively larger distance 164 between the channel plane B and the pivot axis 14 may assist in reducing the distance 162. This may allow for a relatively greater distance between the top of the seat and the body of the rider, as compared to a conventional seat attaching apparatus.

In addition to the channel perimeters 34 and 36, it may also be useful to refer to a rotation perimeter that extends around the pivot axis and can be defined as an extension of the bearing surface. In the illustrated embodiment, the rotation perimeter 114 is a circle and is generally centered about the pivot axis 14 because the bearing surface 13 is generally curved; however, the rotation perimeter could have a different shape, as determined by the shape of the bearing surface in a given embodiment. For example, in the illustrated embodiment, the curved bearing surface 13 forms part of a rotation perimeter 114, that is centered around the pivot axis 14. The radius of curvature of the rotation perimeter 114 is defined by the radius of curvature of the bearing surface 113. In the illustrated embodiment, the radius of the rotation perimeter 114 is greater than the radius of the first or second channel perimeters 34, 36. The radius of the rotation perimeter 114 can be between about 8 mm and 25 mm, is preferably between about 10 mm and 20 mm, and more preferably is about 14 mm.

In addition to the lower seat clamp 10, the seat attachment assembly 100 includes a complimentary upper seat clamp. The upper seat clamp is generally configured to cooperate with the lower seat clamp to secure the rails of a bicycle seat therebetween. To do so, the upper clamp includes two fore-aft running retainer surfaces and on opposing sides of the upper seat clamp corresponding to the channels in the lower seat clamp channels, which receive and hold the rails of a bicycle seat, as described in more detail above. Like the channels in the lower clamp, the retainer surfaces in the upper clamp have a size and shape that is complementary to the expected size and shape of the seat rails so the fit between the retainer surface and the rail is such that movement between the retainer surface and rail is minimized. The retainer surfaces can be oriented in any arrangement that corresponds to the seat rails and can be constructed to correspond to any seat rail shape and size, including but not limited to curved, square, or hexagonal.

Figures 8, 9:
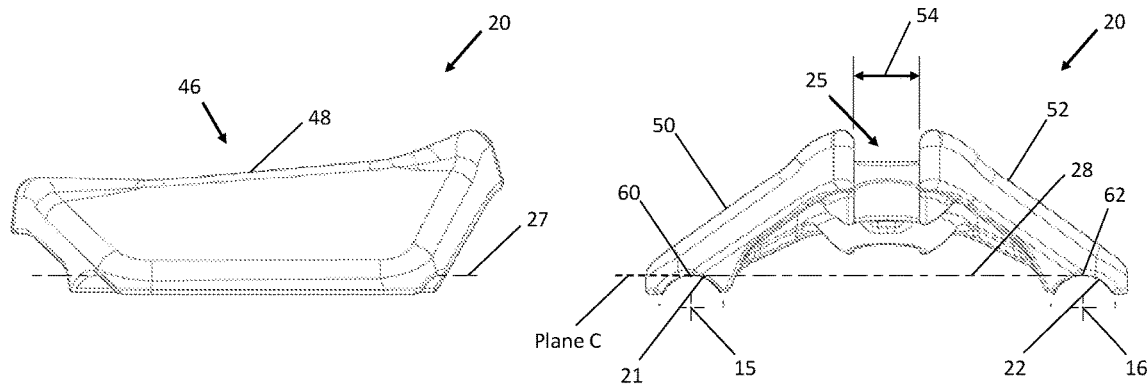
FIG. 8 is a side view of another portion of the seat attaching assembly of FIG. 1.
FIG. 9 is a front view of the portion of the seat attaching assembly of FIG. 8.
Figure 10:
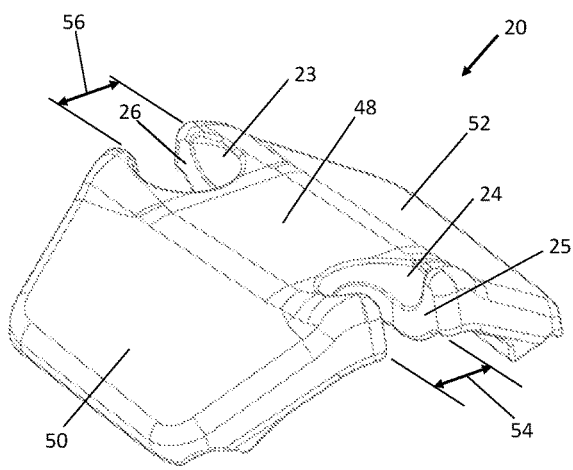
FIG. 10 is a front perspective view of the portion of the seat attaching assembly of FIG. 9.

Referring to FIGS. 8-10, the illustrated embodiment of the upper seat clamp 20 includes main body 46 with a central portion 48 that overlies the mounting portion 42 of the lower seat clamp 10 when the seat attachment assembly 100 is in use. The upper seat clamp 20 also includes a first extension portion 50 that extends generally outwardly and downwardly from a first side of the central portion 48. The first extension portion 50 includes a generally downwardly facing retainer surfaced 21 that is positioned to overlie and face the channel 11 and support surface 30 when the seat attachment assembly 100 is in use. The upper seat clamp 20 also includes an analogous second extension portion 52 that extends generally outwardly and downwardly from a second side of the central portion 48. The second extension portion 52 includes a generally downwardly facing retainer surface 22 that is positioned to overlie and face the channel 16 and support surface 32 when the seat attachment assembly 100 is in use. In this illustrated embodiment, the upper seat clamp is of integral, one-piece construction but in other embodiments, the upper seat clamp may comprise two or more separate pieces.

In this example, the retainer surfaces 21 and 22 are oriented as fore-aft running surfaces on opposing sides of the upper seat clamp 20, which correspond to lower seat clamp channels 11 and 12 and are generally parallel to each other. Retainer surfaces 21, 22 each have an apex 60, 62 which can generally correspond to the uppermost point of the respective retainer surface. In the illustrated example, the retainer surfaces 21 and 22 are generally curved, and the apexes 60 and 62 correspond to the upper most portion of their perimeter, i.e. a position that would tangent to a generally horizontal plane when the upper seat clamp 20 is oriented as show in FIG. 7. If the retainer surfaces have different shapes, such as an angled, peaked, octagonal, square or other such cross-sectional shape, the apexes 60 and 62 may be configured as the corners, vertexes, upper surfaces and other such portions of the differently-shaped surfaces. When the upper seat clamp 20 is in use, the apexes 60 and 62 may be in contact with the upper most surfaces of the respective seat rails when both the retainer surfaces 21 and 22 and rails have the same, or substantially the same, curvature. In other arrangements, for example if the retainer surface includes two converging surfaces that meet at an upper peak and the rails are curved, the respective apexes may be space slightly apart from and above the upper surface of the rails.

Retainer surfaces 21, 22 are sized and shaped to match the profile of the rails 141, 142 of a typical bicycle seat 140. In the illustrated example, retainer surfaces 21, 22 have a circular or ovular upper portion and an open lower portion, corresponding to a common configuration of seat rails.

A fore-aft axis 27 (FIG. 8) running along the upper edge of the first retainer surface 21 and a left-right running axis 28 (FIG. 9) connects the upper surfaces of the retainer surfaces 21 and 22 together. In the illustrated embodiment, the first retainer surface 21 and second retainer surface 22 are located between the pivot axis 14 and the channel plane B. When the seat attachment assembly 100 is in use, the retainer surfaces 21 and 22 may lie along the channel perimeters 34 and 36.

For the purposes of describing the relative position of different features of the present seat attaching assembly, it may also be useful to refer to an upper plane C that is parallel to the channel plane B, but instead of containing the channel axes 15 and 16, is positioned to contain the first apex 60 and second apex 62 of the upper seat clamp 20. The upper plane C is substantially parallel to and located below the pivot axis 14. In some embodiments, the upper plane C intersects the bearing surface 13. In this example, the upper plane C is spaced a distance 166 from the pivot axis 14 and is located between the channel plane B and the pivot axis 14. In the illustrated embodiment, the upper plane C also intersects the bearing surface 13, but in other embodiments it need not. In some embodiments, upper plane C is tangent to both the first and second channel perimeters 34 and 36, as is shown in the present case where the channel perimeters 34 and 36 are generally circular and the rails 141 and 142 are also circular and have the same diameter as the channels 11 and 12. In other embodiments, for example of the rails 141 and 142 have a generally ovular or non-circle cross-sectional shape, the upper plane C may still be defined by the location of the apexes 60 and 62, but may not be tangent to the first and second channel perimeters 34 and 36 (see for example the embodiment of FIG. 18).

To help facilitate attaching the upper and lower seat clamps 10 and 20 to the post head member 110, the seat attachment assembly 100 may include suitable connection apparatuses and features. In embodiments where fasteners are used for connecting the upper and lower seat clamps 10 and 20 to the post head member 110, the components may include suitable apertures to receive and engage the fasteners.

For example, as shown in FIG. 11 in the illustrated embodiment, the post head member 110 has a pair of closed-perimeter apertures 111 and 112 for axially receiving the bolts 101 and 102 (i.e. allowing the bolts 101 and 102 to be inserted by moving them in the direction of their respective axes 105 and 106). The apertures 111 and 112 are configured to receive the shaft portions of the bolts 101 and 102, but to retain the bolt heads 101a and 102a.

Referring to FIG. 10, the upper seat clamp 20 is also configured to include hardware receiving recesses 23 and 24, which are provided in the central portion 48 of the upper seat clamp 20 and generally at the front and rear ends of the upper seat clamp 20 in this example. These recesses 23 and 24 can be used to receive suitable fasteners to help secure the upper seat clamp 20 to the post head member 110. The recesses 23 and 24 may have generally closed perimeters (such as shown for apertures 111 and 112), which would accommodate axial insertion of the bolts 101 and 102 through the recesses 23 and 24. Alternatively, to help facilitate either axial and/or lateral insertion of the bolts 101 and 102 into the recesses 23 and 24, the recesses 23 and 24 may have perimeters that are at least partially open, and for example may include respective slots 25 and 26. The slots 25 and 26 can have respective slot widths 54 and 56 that are sized to be wider than the shaft/threaded portion of the bolts 101 and 102, which can allow the bolts 101 and 102 to be laterally inserted into the recesses 23 and 24.

The upper ends of the bolts 101 and 102 can threadedly engage suitable nuts, such as nuts 103 and 104, to help hold the seat attachment assembly 100 together. In the illustrated example, the nuts 103 and 104 are configured to be axially nested within the recesses 23 and 24 on the upper seat clamp 20 in a non-rotatable manner. That is, when the nuts 103 and 104 are nested within the recesses 23 and 24, the physical interference between nuts 103 and 104 and recesses 23 and 24 will inhibit rotation of nuts 103 and 104. This can help facilitate tightening of the bolts 101 and 102 and of the overall seat attachment assembly 100 without requiring a user to physically hold the nuts 103 and 104. This may be helpful, as the nuts 103 and 104 will be underneath the seat 140 when a seat is present. When bolts 101 and 102 are tightened, nuts 103 and 104 pull the upper seat clamp 20 towards the lower seat clamp 10 and post head member 110, thereby securing the seat 140.

Figure 12:
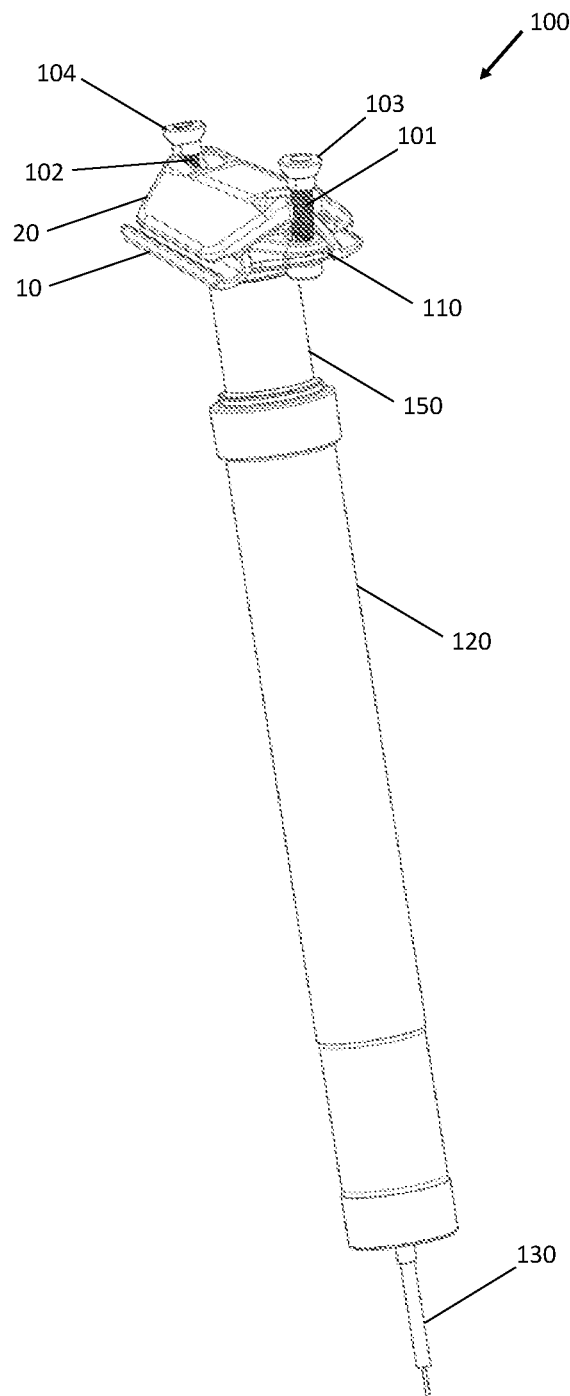
FIG. 12 is a front perspective view of the seat attaching assembly of FIG. 11.
Figure 13:
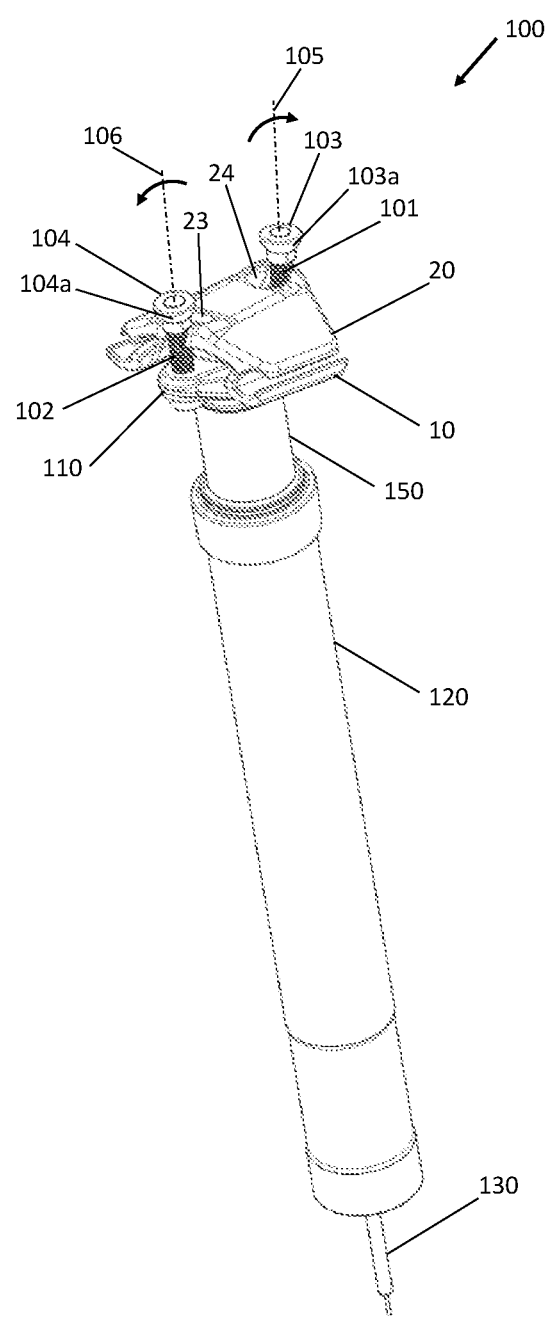
FIG. 13 is a rear perspective view of the seat attaching assembly of FIG. 11.

The nuts 103 and 104 are also configured to have diameters, such as diameter 58 in FIG. 11, that are greater than the widths 54 and 56 of the slots 25 and 26 in their respective recesses 23 and 24. In this configuration, when the bolts 101 and 102 are tightened, the nuts 103 and 104 are firmly seated within the recesses 23 and 24 and are not laterally removable through the slots 25 and 26. This can help prevent lateral movement of the bolts 101 and 102. When the bolts 101 and 102 are loosened, the bolts 101 and 102 and associated nuts 103 and 104 can be translated axially upwardly such that the nuts 103 and 104 are lifted out of their respective recesses 23 and 24. In this arrangement, the bolts 101 and 102 can be laterally removed or inserted through the recesses 25 and 26, and can carry their respective nuts 103 and 104 along with them such that the bolts 101 and 102 can be removed from the recesses 23 and 24 without having to detach the nuts 103 and 104. For example, FIGS. 12 and 13 show the nuts 103 and 104 and bolts 101 and 102 in a loosened configuration. As illustrated, when in the loosened configuration (and with the bolts 101 and 102 being pushed upwardly by a user, etc.), the circular contact surfaces 103a and 104a of nuts 103 and 104 are spaced above corresponding nut recesses 23 and 24 of the upper seat clamp 20. Open-ended slots 25 and 26 of the upper seat clamp 20 then allows the bolts 101 and 102 to pass through, which can allow the upper seat clamp 20 to be completely removed from seat post assembly 100.

Referring to FIG. 14, in the illustrated embodiment, the post head member 110 and upper seat clamp 20 are configured so that the bolts 101 and 102 are positioned outside the rotation perimeter 114 when the seat attachment assembly 100 is assembled. This can help accommodate a desired nesting of the upper seat clamp 20, lower seat clamp 10, and post head member 110, and may help reduce the overall size of the seat attachment assembly 100. Optionally, as illustrated in this example, at least one bolt, such as bolt 101, can be positioned forward of the rotation perimeter 114, and another bolt, such as bolt 102, can be positioned rearward of the rotation perimeter 114. This can help balance the loading of the bolts 101 and 102, and can help facilitate access to the bolts 101 and 102 for tightening or loosening while the seat attachment assembly 100 is in use (for example to help with seat pivoting as described herein). In the illustrated example, the rotation perimeter 114 fits entirely between axes 105 and 106, or in other words, at least the bolt axes 105 and 106 and optionally the entirety of the bolts 101 and 102 themselves are outside the rotation perimeter 114. The bolts 101 and 102 are also, in this example, shown as being optionally inclined such that their respective axes 105 and 106 converge above the upper seat clamp 20. Such a configuration may assist in reducing the overall size and facilitate the desired pivotability of the seat attaching assembly. This may also help facilitate a better tool angle for adjusting the bolts 101 and 102. In other embodiments, the bolts 101 and 102 may be parallel, or inclined in a different orientation.

Figure 15:
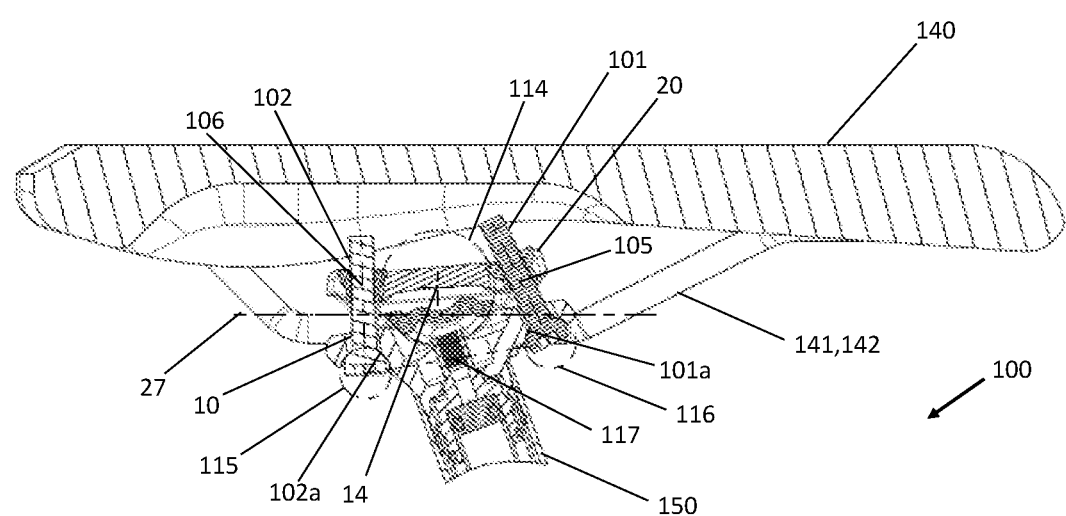
FIG. 15 is a side cross-sectional view of the seat attaching assembly of FIG. 14.

FIGS. 14 and 15 further illustrate the rotation perimeter 114, as well as construction circles 115 and 116, which illustrate the diameters of circular contact surfaces 101a and 102a of bolts 101 and 102.

In this arrangement, the bolts 101 and 102 are spaced from and do not pass through or otherwise directly contact the lower seat clamp 10. Instead, the bolts 101 and 102 extend between and engage the post head member 110 and the upper seat clamp 20. While the lower seat clamp 10 is essentially sandwiched and held in place between these members, it does not itself require apertures, threaded regions, or other features to engage or accommodate the bolts 101 and 102. This can help simplify the design and manufacture of the lower seat clamp 10, and may help reduce its overall size. Reducing the size of a component may also help reduce its weight, which may be advantageous if a user/rider is attempting to reduce the overall weight of the bicycle. This arrangement may also help reduce and/or eliminate the need to remove or otherwise substantially manipulate the lower seat clamp 10 when attaching or detaching the seat from the seat attachment assembly FIG. 11 illustrates an exploded view of the illustrated embodiment of the present seat post assembly 100. Semi-circular bearing surface 13 of the lower seat clamp 10 can be seen to have a corresponding cradle 113 on the post head member 110. The lower seat clamp 10 is able to rotate about pivot axis 14 within the cradle portion 113. Once mounted, tightening and loosening bolts 101 and 102, optionally with circular contact surfaces 101a and 102a, can be used to manipulate the angle of upper seat clamp channels 21 and 22. For example, tightening bolt 101 and loosening bolt 102 can rotate the seat 140 forward, and vice versa. When seat 140 is installed as illustrated in FIG. 14, the seat rails 141 and 142 can help align the channels 21 and 22 with the channels 11 and 12 of the lower clamp 10.

FIGS. 14 and 15 illustrate the dropper post assembly 100 with the bicycle seat 140 mounted and with the seat rails 141 and 142 fully clamped by channels 11, 12 of the lower seat clamp 10 and retaining surfaces 21 and 22 of upper seat clamp 20, respectively. In the illustrated embodiment, fore-aft axis 27 of the upper seat clamp 20, and therefore the entirety of the mounting portion of rails 141 and 142, are located below the pivot axis 14.

Figure 16:
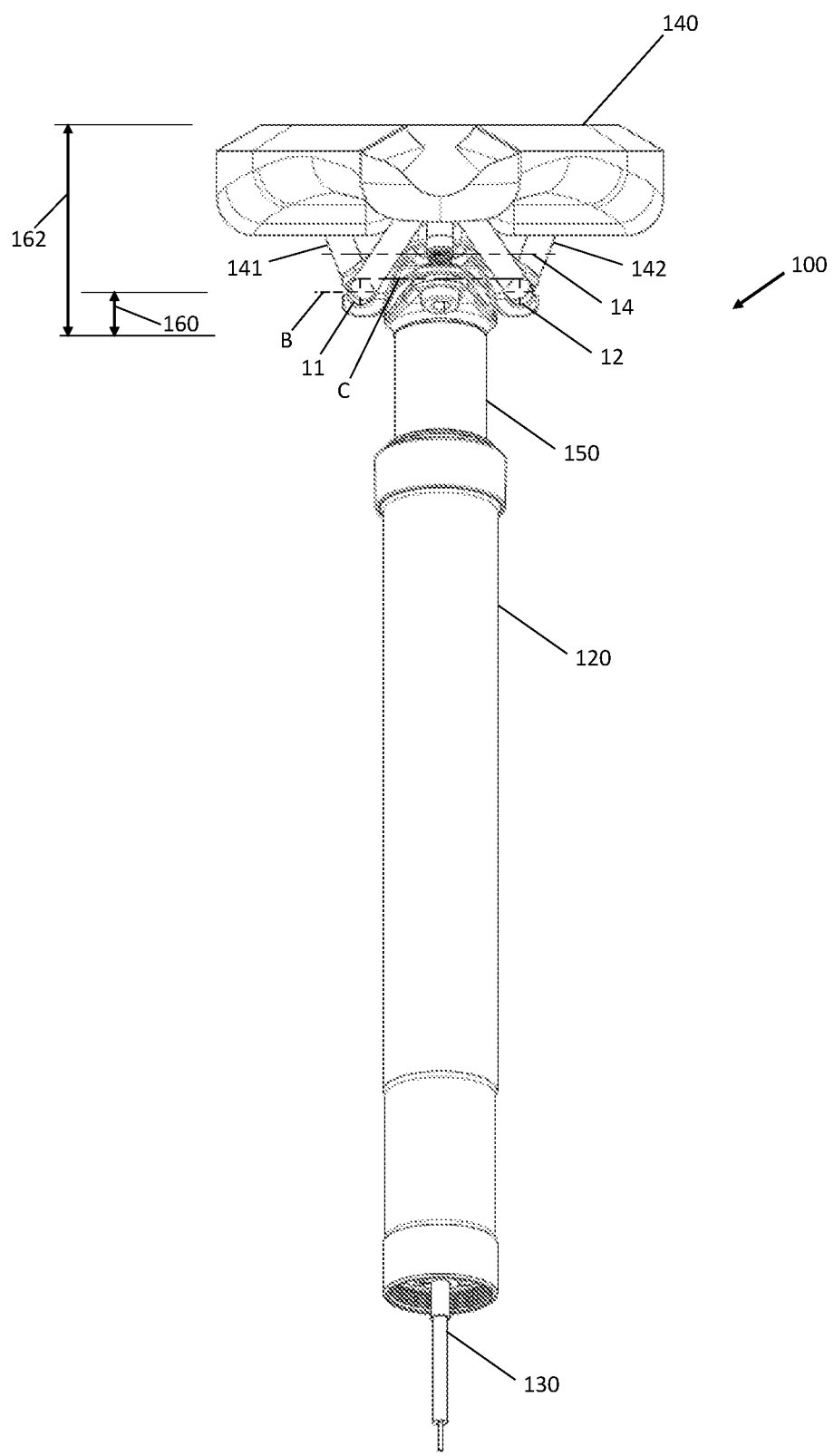
FIG. 16 is a front view of the seat attaching assembly of FIG. 12.

FIGS. 16 and 17 illustrate dropper post 100 with seat 140 mounted and with seat rail 141 clamped between channel 11 of the lower seat clamp and retainer surface 21 of the upper seat clamp and seat rail 142 clamped between channel 12 of the lower seat clamp and retainer surface 22 of the upper seat clamp. Channel planes B and upper plane C are shown in this view, along with the entirety of the mounting portion of rails 141 and 142 as being on the same side of and disposed below the pivot axis 14. FIG. 18 illustrates another embodiment in which the seat rails 1141, 142 are oval in shape.

Figure 19A:
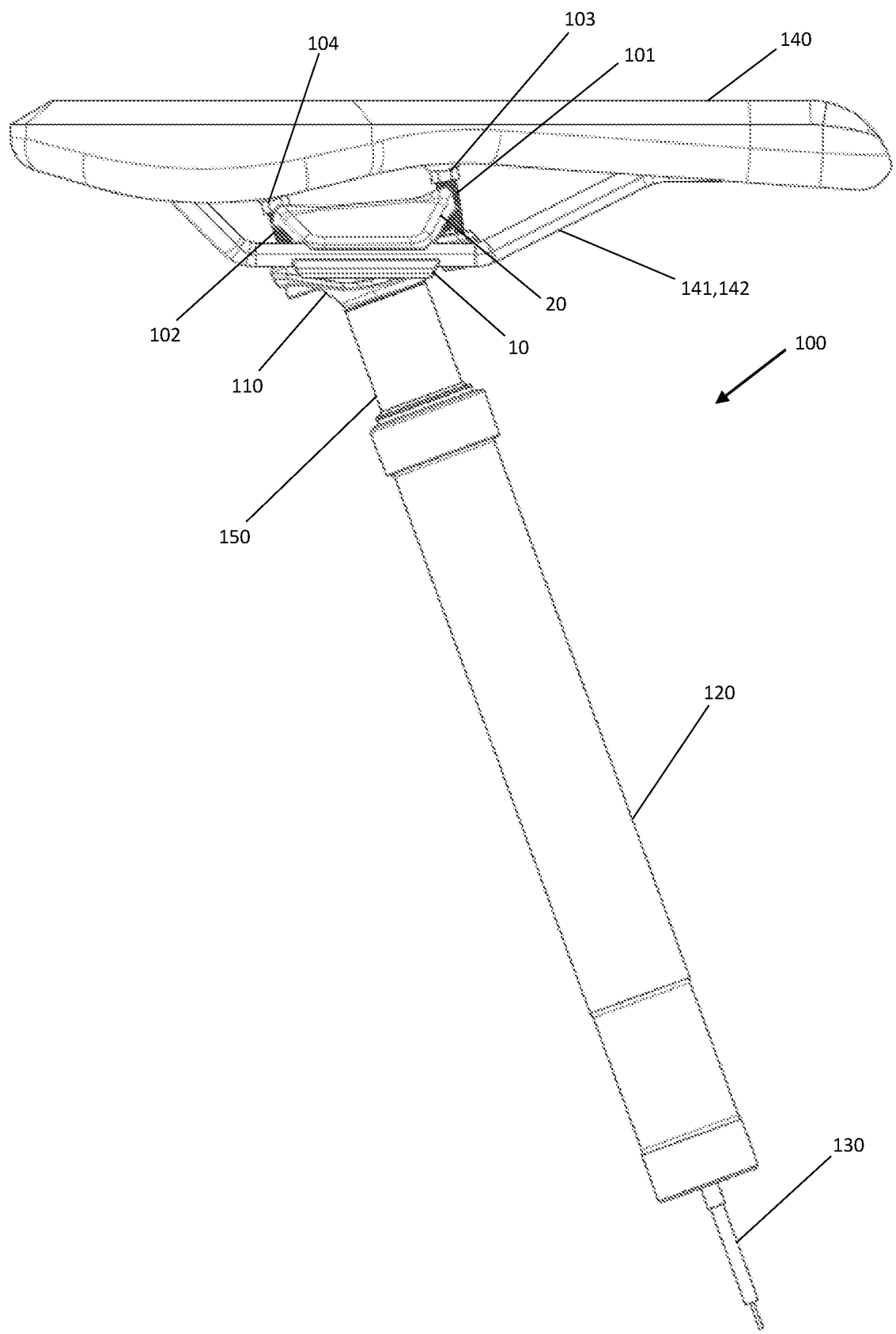
FIGS. 19a-19c are side views of the seat attaching assembly of FIG. 14, illustrating the detachment of the upper seat clamp from the post head member, wherein (a) the nuts securing the upper seat clamp to the post head member are in a loosened configuration, (b) the rear portion of the upper seat clamp is detached from the post head member, and (c) the upper seat clamp is fully detached from the post head member.
Figure 19B:
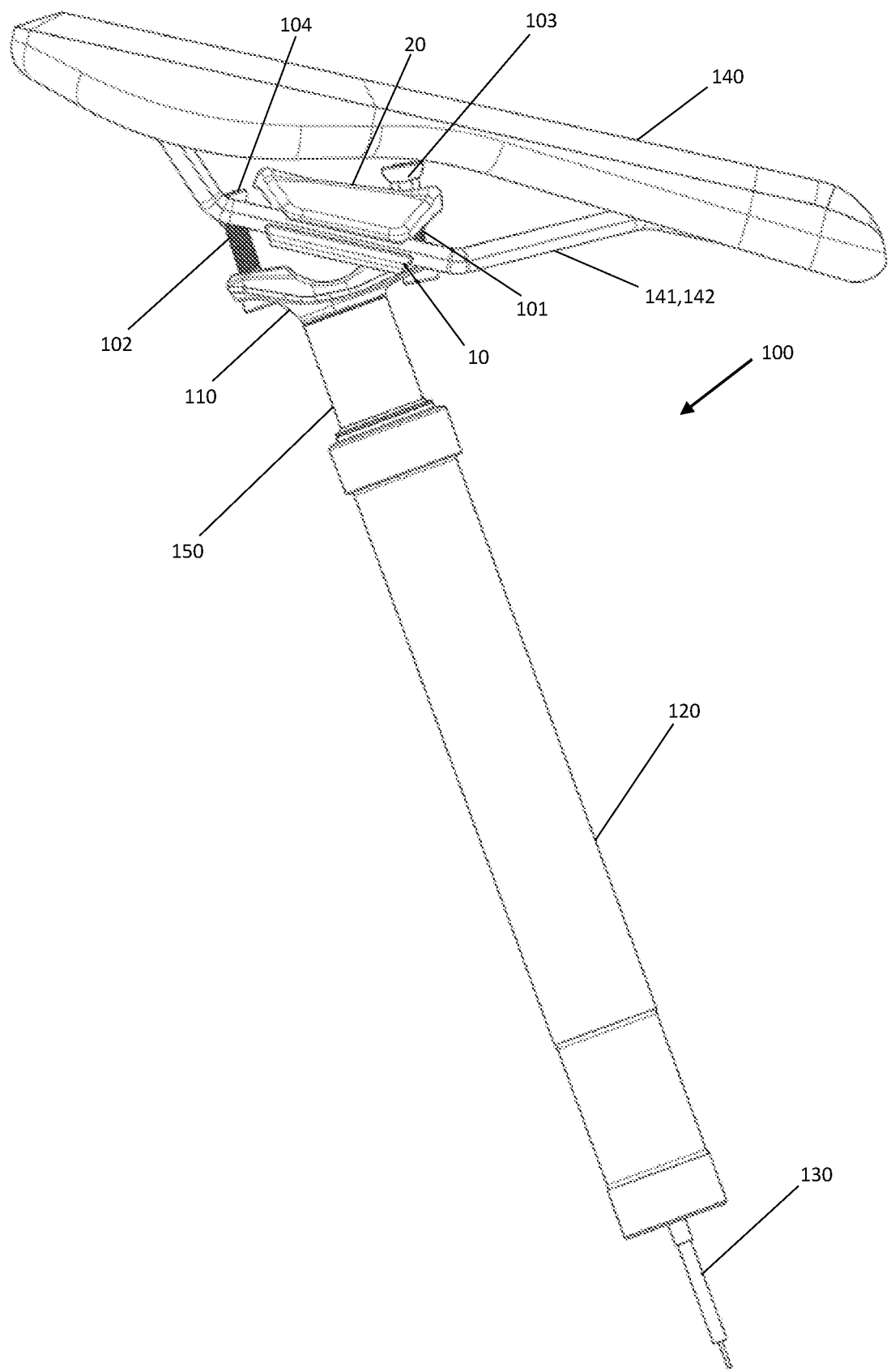
Figure 19C:
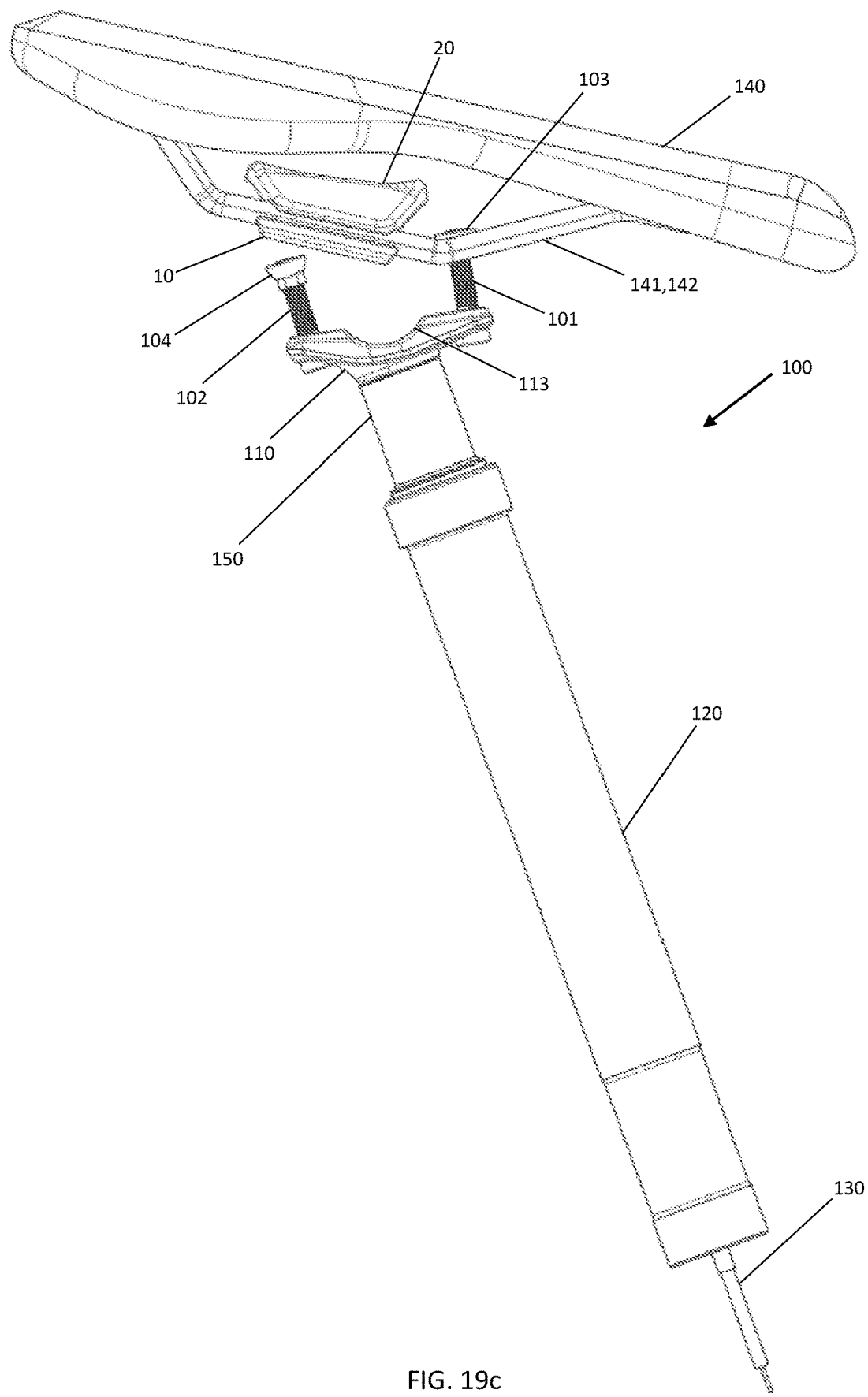
Figures 20, 21:
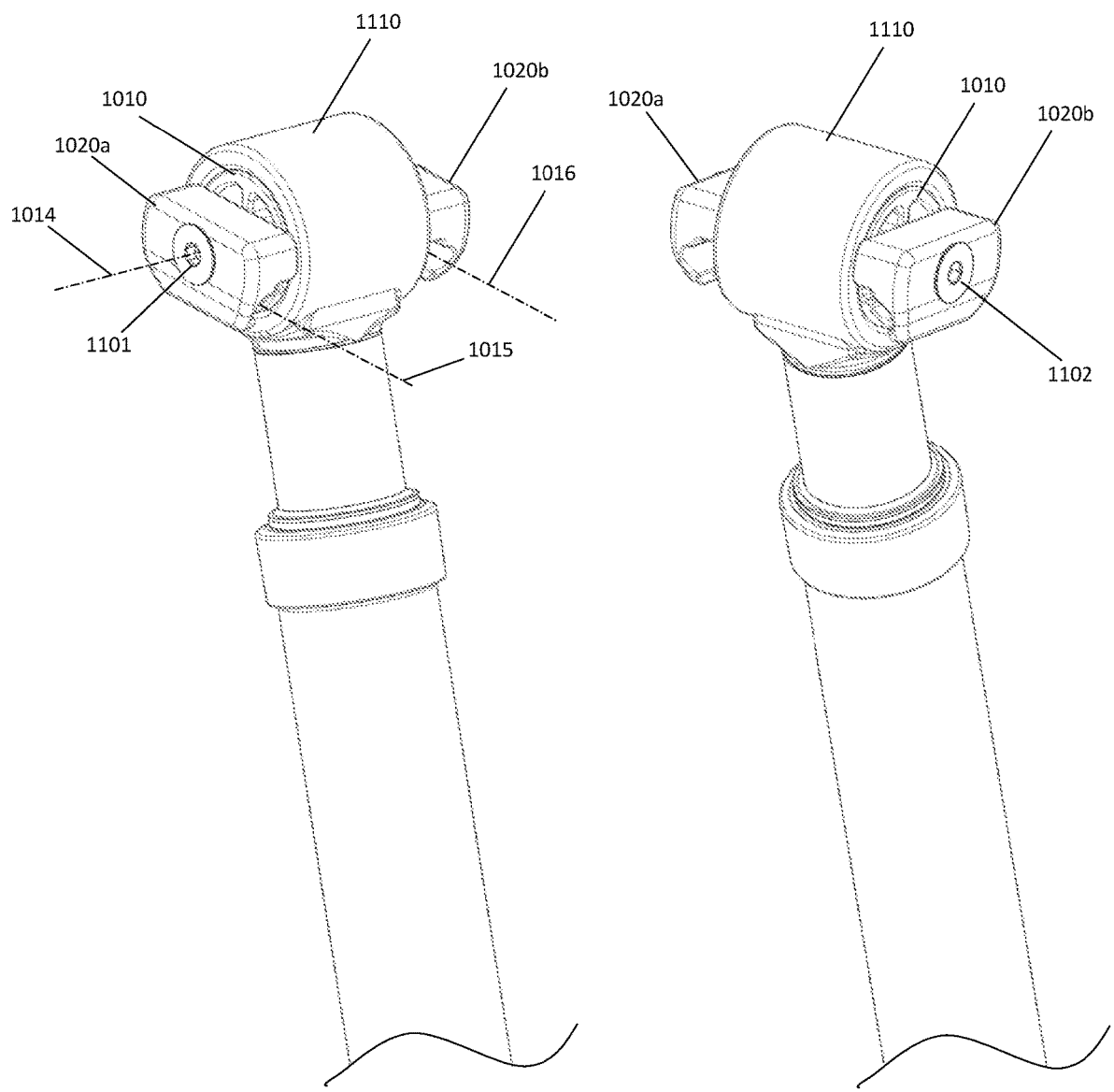
FIG. 20 is a perspective view of another example of a seat attaching assembly connected to a dropper seat post.
FIG. 21 is another perspective view of the seat attaching assembly of FIG. 20.
Figure 22:
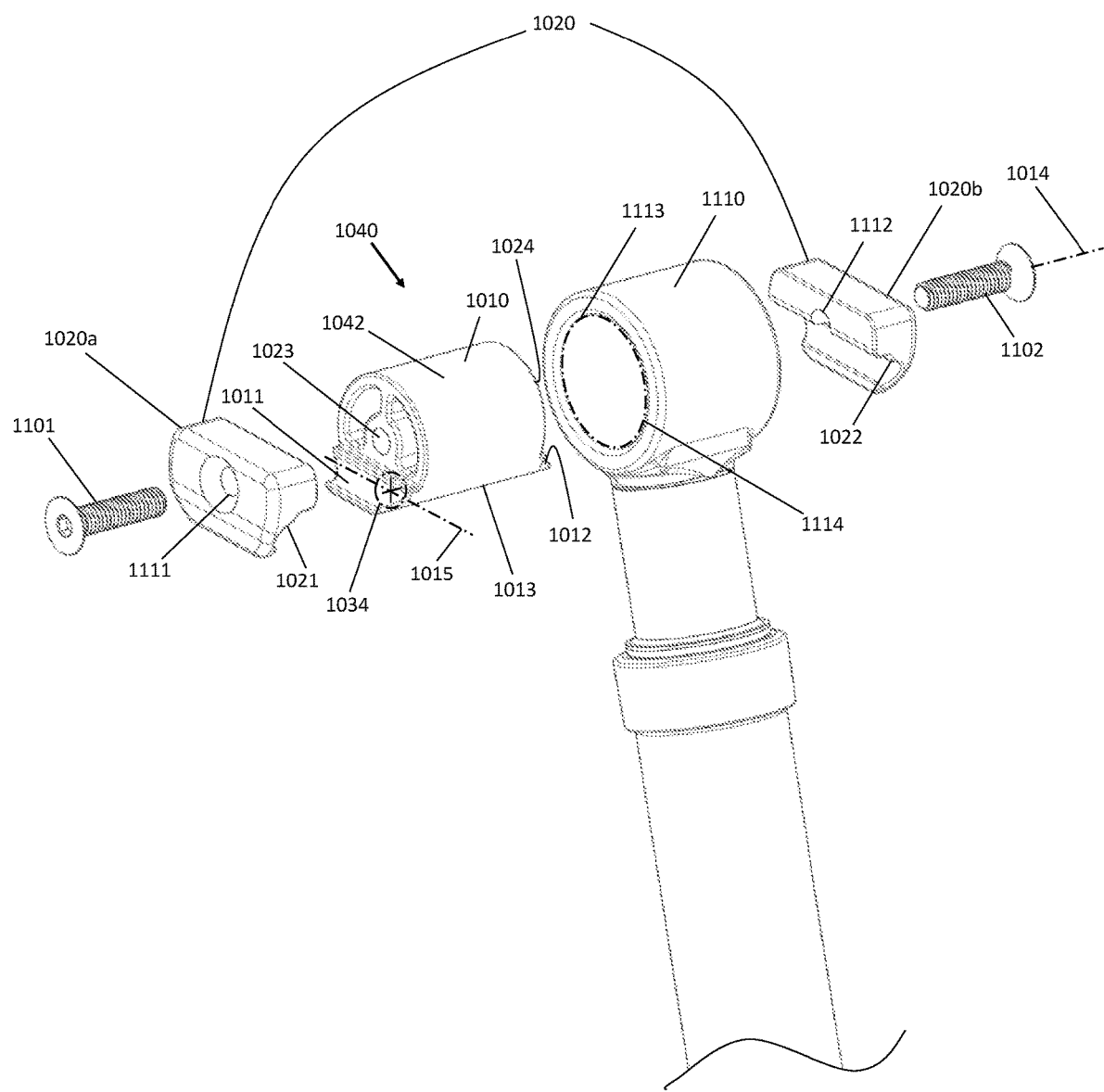
FIG. 22 is a partially exploded perspective view of the seat attaching assembly of FIG. 20.
Figure 23:
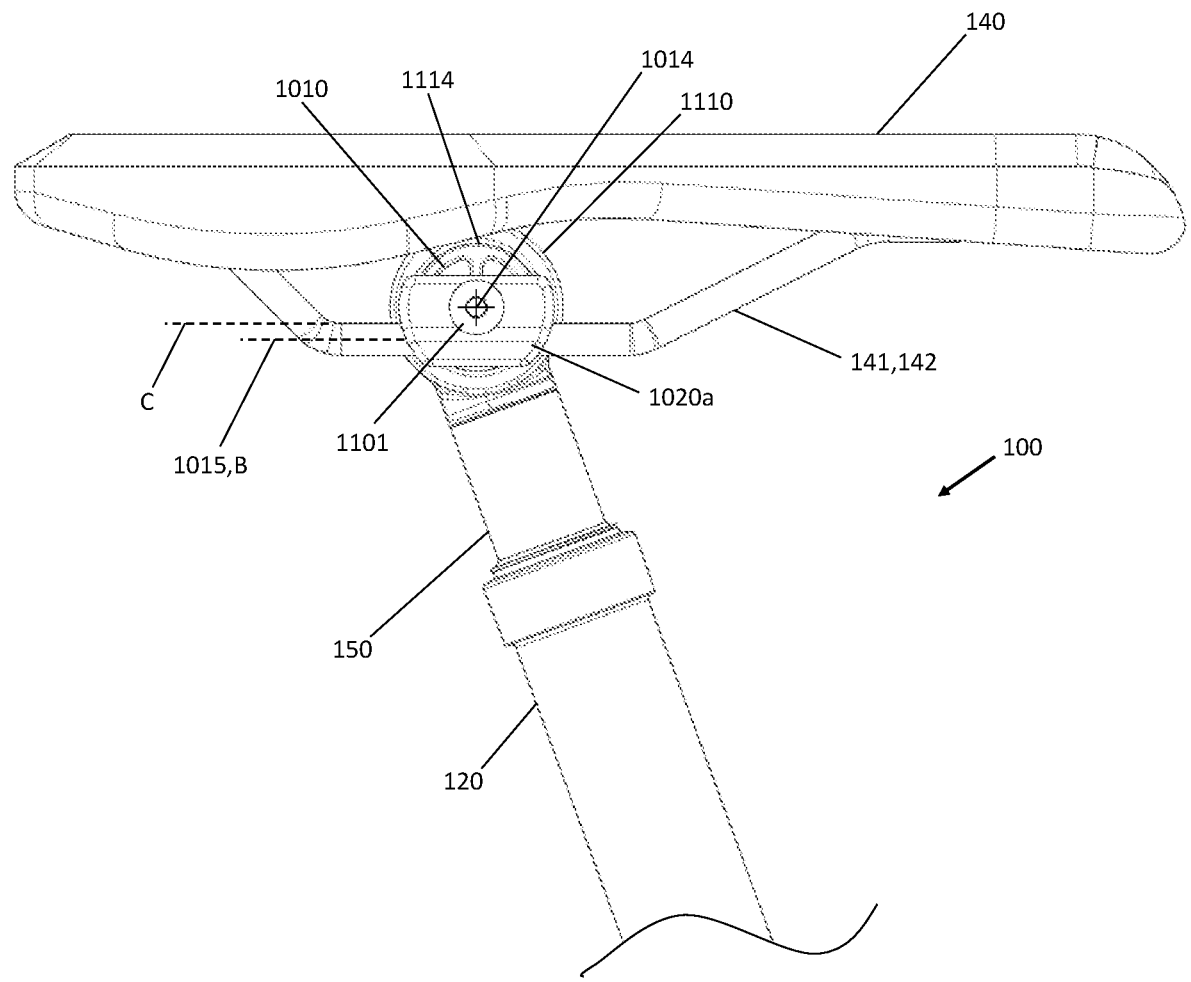
FIG. 23 is a side view of the seat attaching assembly of FIG. 20, wherein the seat attaching assembly is securing the rails of a bicycle seat.
Figure 24:
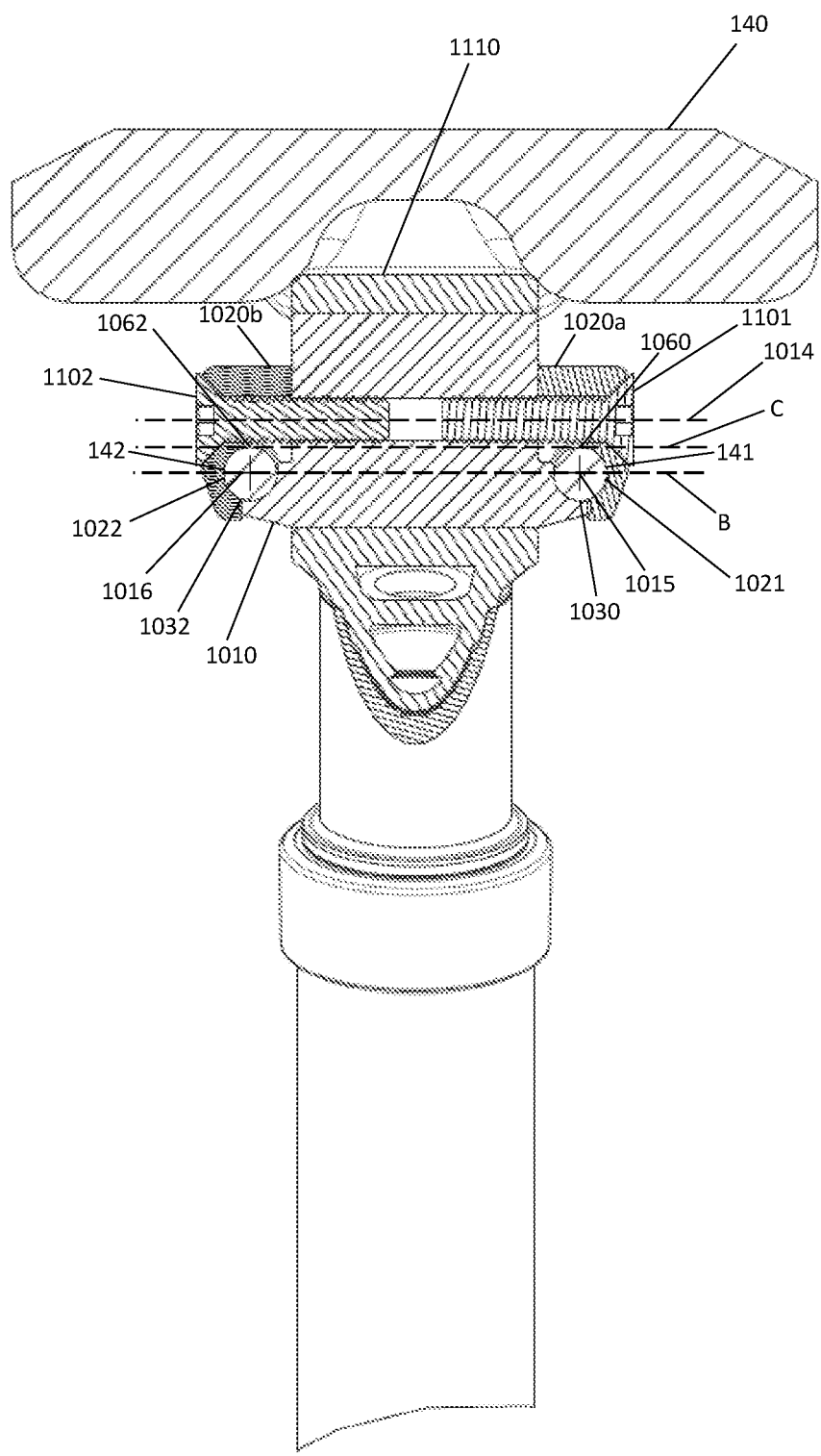
FIG. 24 a front cross-sectional view of the seat attaching assembly of FIG. 20, taken along line B-B in FIG. 23.

Optionally, the upper seat clamp 20 can be entirely removed from the lower seat clamp 10 and post head member 110 to help facilitate attaching and detaching of the seat 140. Preferably, the upper seat clamp 20 can be removed, and re-attached, without having to remove the bolts 101 and 102 from the post head member 110, and without having to remove the nuts 103 and 104 from the bolts 101 and 102. This can help facilitate installation of the seat 140 while helping to reduce the likelihood of one of the fasteners being lost or separated from the seat attachment assembly 100. As illustrated in FIGS. 19a-c, to remove the seat 140 from the seat attaching assembly 100, bolts 101 and 102 are loosened from the nuts 103 and 104 almost completely such that, when the bolts 101 and 102 are pushed up, the contact surfaces 103a and 104a of nuts 103 and 104 are no longer in contact with corresponding nut recesses 23 and 24 of the upper clamp 20. The upper seat clamp 20 can then be laterally disengaged from the seat post assembly 100 by tilting bolts 103 and 104 through the open-ended slots 25 and 26, respectively. In doing so, the upper seat clamp 20 can be disengaged from the post head member 110 without having to completely remove the bolts 101, 102 or nuts 103, 104 from apertures 111 and 112 of the post head member 110. Once the upper seat clamp 20 is detached from the post head member 110, the seat rails 141, 142 can be removed from channels 11 and 12 of the lower seat clamp 10.

To attach the bicycle seat 140 to the seat attaching assembly 100, the lower seat clamp 10 is arranged on the post head member 110, such that the bearing surface 13 of the lower seat clamp 10 is engaged with the cradle portion 113 of the post head member 110. The seat rails 141 and 142 are then placed into channels 11 and 12 of the lower seat clamp 10, respectively. To attach the upper seat clamp 20, bolts 101 and 102 are laterally moved into the recesses 23 and 24 of the upper clamp 20 through open-ended slots 25 and 26, respectively. Bolts 101 and 102 are then tightened to seat the nuts 103 and 104 within the recesses 23 and 24 and to squeeze the seat rails 141 and 142 between the retaining surfaces 21 and 22 of the upper seat clamp 20 and channels 11 and 12 of the lower seat clamp 10.

The upper seat clamp 20 can alternatively be secured to the post head member 110 using any suitable, and preferably releasable/detachable fastening means, including suitable fasteners (screws, bolts, etc.), adhesives, clips, interference fits, detents, and the like.

FIGS. 20-24 illustrate an alternative embodiment of the seat attaching assembly 1100 that is generally analogous to seat attaching assembly 100, and in which analogous features are identified using like reference characters indexed by 1000.

In this embodiment, the post head member 1110 is configured as a generally enclosed, circular type of member, and a least a portion of the inner surface of this loop can provide the cradle portion 1113 and surface for supporting the lower seat clamp 1010. The lower seat clamp 1010 has a complementary configuration wherein its main body 1040 and mounting portion 1042 are generally cylindrical in shape so as to fit within the post head member 1110. In this arrangement, the lower seat clamp 1010 can rotate about its central axis within the post head member 1110, which can define the rotation axis 1014, and the inner perimeter of the post head member 1110 can define the rotation perimeter 1114. The lower seat clamp 1010 includes channels 1011 and 1012, which define respective channel axes 1015 and 1016, and have respective lower surfaces 1030 and 1032.

The lower surface of the mounting portion 1042 can provide the bearing surface 1013, which extends around the exterior surface of the lower seat clamp 1010 and is configured to be complementary to and engage with a corresponding cradle portion 1113 of the post head member 1110, the cradle portion 1113 extending around the interior surface of the post head member 1110. In both embodiments illustrated herein, when the seat attachment assembly 100 and 1100 are in use, the pivot axis 14, 1114 intersects portions of the upper seat clamp 20, 1020 at a location that is above planes B and C.

In this embodiment, instead of being provided as a unitary, one-piece member, the upper seat clamp 1020 is configured as a two-part member, having a first portion 1020a providing the retainer surface 1021, and a second portion 1020b having the retainer surface 1022. The retainer surfaces 1021, 1022 correspond to and overlie the channels 1011, 1012 in the lower seat clamp when the first and second portions 1020a and 1020b are attached. The upper seat clamp portions 1020a and 1020b can be secured to the lower seat clamp 1010 by any suitable fastening means, including any described herein. In the illustrated embodiment, the fastening means comprises bolts 1101 and 1102 that extend through apertures 1111 and 1112 in the upper seat clamp and threadedly engage with receiving recesses 1023 and 1024 in the lower seat clamp 1010. When bolts 1101 and 1102 are tightened, the upper seat clamp 1020 is pulled towards the lower seat clamp 1010 and post head member 1110, thereby securing seat rails between the retainer surfaces 1021, 1022 and corresponding channels 1011, 1012.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent, or patent application was specifically and individually indicated to be incorporated by reference in its entirety.

What is claimed is:

1. A seat attaching assembly for attaching a bicycle seat to a seat post, the seat attaching assembly comprising:
   a) a post head member configured to be connected to a seat post, the post head member comprising a cradle portion;
   b) a lower seat clamp being selectably moveable relative to the post head member about a pivot axis to change an orientation of the lower seat clamp, the lower seat clamp comprising:
      i. a mounting portion having a bearing surface configured to bear against the cradle portion;
      ii. a first channel configured to receive a first seat rail of a bicycle seat;
      iii. a second channel configured to receive a second seat rail of a bicycle seat;
   c) an upper seat clamp comprising:
      i. a central portion overlying the mounting portion;
      ii. a first extension portion disposed on a first side of the central portion and having a first retainer surface overlying and facing the first channel to retain the first seat rail within the first channel and having a first apex;
      iii. a second extension portion disposed on a second side of the central portion and having a second retainer surface overlying and facing the second channel to retain the second seat rail within the second channel and having a second apex;
   d) an upper plane containing both the first apex and second apex and being substantially parallel to the pivot axis, the upper plane being offset below the pivot axis and intersecting the bearing surface; and
   e) at least a first fastener for securing the upper seat clamp to the post head member and inhibiting movement of the lower seat clamp relative to the post head member.

2. The seat attaching assembly of claim 1, wherein the bearing surface defines a rotation perimeter centered about the pivot axis and the first fastener extends along a first fastener axis and the first fastener axis is outside the rotation perimeter.

3. The seat attaching assembly of claim 2, further comprising a second fastener for securing the upper seat clamp to the post head member and inhibiting movement of the lower seat clamp relative to the post head member, the second fastener extending along a second fastener axis and the second fastener axis is outside the rotation perimeter.

4. The seat attaching assembly of claim 3, wherein the first and second fastener axes are on opposite sides of the rotation perimeter.

5. The seat attaching assembly of claim 3, wherein at least one of the first fastener and the second fastener are entirely outside the rotation perimeter.

6. The seat attaching assembly of claim 2, wherein the bearing surface is a generally smooth, curved surface to slidingly engage the cradle portion, and wherein a radius of curvature of the bearing surface defines a radius of curvature of the rotation perimeter.

7. The seat attaching assembly of claim 1, wherein the first channel extends along a first channel axis and the second channel extends along a second channel axis, and wherein a channel plane containing both the first channel axis and the second channel axis either intersects or is disposed below the bearing surface.

8. The seat attaching assembly of claim 7, wherein the channel plane intersects the bearing surface.

9. The seat attaching assembly of claim 1, wherein the first channel extends along a first channel axis and the second channel extends along a second channel axis and wherein the first channel has a curved lower surface to support the first seat rail and the second channel has curved lower surface to support the second seat rail, the first channel curved lower surface forming part of a first channel perimeter centered about the first channel axis and the second channel curved lower surface forming part of a second channel perimeter centered about the second channel axis, and wherein the upper plane is tangent to both the first channel perimeter and the second channel perimeter.

10. The seat attaching assembly of claim 1, wherein the first extension portion of the upper seat clamp extends outwardly and downwardly from the first side of the central portion and the second extension portion of the upper seat clamp extends outwardly and downwardly from the second side of the central portion.

* * * * *